US010654003B2

(12) United States Patent
Le et al.

(10) Patent No.: US 10,654,003 B2
(45) Date of Patent: May 19, 2020

(54) HOLLOW FIBER STRUCTURES, METHODS OF USE THEREOF, METHODS OF MAKING, AND PRESSURE-RETARDED PROCESSES

(71) Applicant: King Abdullah University of Science and Technology, Thuwal (SA)

(72) Inventors: Lieu Ngoc Le, Thuwal (SA); Murthy Srivatsa Bettahalli Narasimha, Thuwal (SA); Suzana Nunes, Thuwal (SA); Tai-Shung Chung, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 128 days.

(21) Appl. No.: 15/578,898

(22) PCT Filed: Jun. 3, 2016

(86) PCT No.: PCT/IB2016/053280
§ 371 (c)(1),
(2) Date: Dec. 1, 2017

(87) PCT Pub. No.: WO2016/193946
PCT Pub. Date: Dec. 8, 2016

(65) Prior Publication Data
US 2018/0169592 A1 Jun. 21, 2018

Related U.S. Application Data

(60) Provisional application No. 62/170,297, filed on Jun. 3, 2015.

(51) Int. Cl.
B01D 69/12 (2006.01)
B01D 61/00 (2006.01)
(Continued)

(52) U.S. Cl.
CPC .......... *B01D 69/12* (2013.01); *B01D 61/002* (2013.01); *B01D 69/02* (2013.01); *B01D 69/08* (2013.01);
(Continued)

(58) Field of Classification Search
CPC .. B01D 69/12; B01D 61/002; B01D 67/0006; B01D 67/0016; B01D 69/02;
(Continued)

(56) References Cited

U.S. PATENT DOCUMENTS 5,868,975 A * 2/1999 Lee ...................... B01D 53/228
264/184
2019/0030493 A1 * 1/2019 Chowdhury ........... B01D 71/56

FOREIGN PATENT DOCUMENTS

KR 2014066603 A * 6/2014 .......... B01D 169/02
WO 2011/069050 6/2011
(Continued)

OTHER PUBLICATIONS

Sun, S.-P., Chung, T.-S., "Outer-Selective Pressure-Retarded Osmosis Hollow Fiber Membranes from Vacuum-Assisted Interfacial Polymerization for Osmotic Power Generation", Environ. Sci. Technol., 2013, 47, 13167-13174. (Year: 2013).*

(Continued)

Primary Examiner — James C Goloboy
(74) Attorney, Agent, or Firm — Billion & Armitage; Lisbeth C. Robinson

(57) ABSTRACT

Embodiments of the present disclosure provide for composite materials, methods of making composite materials, methods of using composite materials, and the like. In particular, the present application relates to hollow fibers and to pressure-retarded osmosis systems comprising said fibers. The hollow fibers have an inside layer and an outside layer, wherein the outside layer covers an outside surface of the (Continued)

inside layer, wherein the inside layer forms a boundary around the lumen, wherein the inside layer includes a bi-layer structure, wherein the bi-layer structure includes a sponge-like layer and a finger-like layer, wherein the sponge-like layer is disposed closer to the lumen of the hollow fiber and the finger-like layer is disposed on the sponge-like layer on the side opposite the lumen, wherein the outside layer includes a polyamide layer.

17 Claims, 11 Drawing Sheets

(51) Int. Cl.
B01D 69/02 (2006.01)
B01D 71/56 (2006.01)
B01D 71/64 (2006.01)
B01D 69/08 (2006.01)
B01D 67/00 (2006.01)

(52) U.S. Cl.
CPC ........... *B01D 69/081* (2013.01); *B01D 71/56* (2013.01); *B01D 71/64* (2013.01); *B01D 67/0006* (2013.01); *B01D 67/0016* (2013.01); *B01D 2325/021* (2013.01); *B01D 2325/025* (2013.01); *B01D 2325/026* (2013.01); *B01D 2325/04* (2013.01)

(58) Field of Classification Search
CPC .................. B01D 69/08; B01D 69/081; B01D 2323/021; B01D 2323/025; B01D 2323/026; B01D 2323/04
See application file for complete search history.

(56) References Cited

FOREIGN PATENT DOCUMENTS

| WO | 2012/146629 | 11/2012 |
| WO | 2013/039456 | 3/2013 |
| WO | 2014/204403 | 12/2014 |

OTHER PUBLICATIONS

English-language abstract of KR2014066603A (Year: 2014).*
Zhang, S., Fu, F., Chung, T.-S., "Substrate modifications and alcohol treatment on thin film composite membranes for osmotic power", Chemical Engineering Science, 2013, 40-50 (Year: 2013).*
Lide, "CRC Handbook of Chemistry and Physics", Oct. 2003, 1-1332.
Shi-Peng, et al., "Outer-Selective Pressure-Retarded Osmosis Hollow Fiber Membranes from Vacuum-Assisted Interfcial Polymerication for Osmotic Power Generation", Environmental Science & Technology, vol. 47, Oct. 11, 2013, pp. 13167-13174.
Zhang, et al., "Minimizing the Instant and Accumulative Effects of Salt Permeability to Sustain Ultrahigh Osmotic Power Density", Environmental Science & Technology, 2013, 10085-10092.
Maria van der Hoeven, "World Energy Outlook", International Energy Agency, 2014, 1-748.
Alagumalai, et al., "Cellulose acetate and polyetherimide blend ultrafiltration membranes: II. Effect of additive", InterScience, 2007, 24-35.
Aminabhavi, et al., "Density, Viscosity, and Refractive Index of the Binary Mixtures of Cyclohexane with Hexane, Heptane, Octane, Nonane, and Decane at (298.15, 303.15, and 308.15) K", J. Chem. Eng. Data, 1996, 521-525.
Arena, et al., "Surface modification of thin film composite membrane support layers with polydopamine: Enabling use of reverse osmosis membranes in pressure retarded osmosis", Journal of Membrane Science, 2011, 55-62.
Aroon, et al., "Morphology and permeation properties of polysulfone membranes for gas separation: Effects of non-solvent additives and co-solvent", Separation and Purification Technology 72, 2010, 194-202.
Barton, "Solubility Parameters", Chemical Reviews,, 1974, 731-753.
Bessire, et al., "Effect of Temperature and Viscosity on Rotational Diffusion of Merocyanine 540 in Polar Solvents", J. Phys. Chem, 1994, 13083-13092.
Bonyadi, et al., "Investigation of corrugation phenomenon in the inner contour of hollow fibers during the non-solvent induced phase-separation process", Journal of Membrane Science, 2007, 200-210.
Chou, et al., "Effect of take-up speed on physical properties and permeation performance of cellulose acetate hollow fibers", Journal of Membrane Science, 2005, 259-267.
Chunlong, et al., "Controlled synthesis of high performance polyamide membrane with thin dense layer for water desalination", Journal of Membrane Science 362, 2010, 76-80.
Gang, et al., "High performance thin film composite pressure retarded osmosis(PRO) membranes for renewable salinity-gradient energy generation", Journal of Membrane Science 440, 2013, 108-121.
Gang, et al., "Highly Robust Thin-Film Composite Pressure Retarded Osmosis (PRO) Hollow Fiber Membranes with High Power Densities for Renewable Salinity-Gradient Energy Generation", Environmental Science and Technology, 2013, 8070-8077.
Gasa, et al., "Influence of Blend Miscibility on the Proton Conductivity and Methanol Permeability of Polymer Electrolyte Blends", Wiley Inter Science, 2006, 2253-2266.
Gerstandt, et al., "Membrane processes in energy supply for an osmotic power plant", Desalination 224, 2008, 64-70.
Ghosh, et al., "Impacts of support membrane structure and chemistry on polyamide-polysulfone interfacial composite membranes", Journal of Membrane Science 336, 2009, 140-148.
Jian, et al., "Molecular design of thin film composite (TFC) hollow fiber membranes for isopropanol dehydration via pervaporation", Journal of Membrane Science, 2012, 123-133.
Jian, et al., "Novel organic-inorganic thin film composite membranes with separation performance surpassing ceramic membranes for isopropanol dehydration", Journal of Membrane Science 433, 2013, 60-71.
Jian-Jun, et al., "Effects of orientation relaxation and bore fluid chemistry on morphology and performance of polyethersulfone hollow fibers for gas separation", Journal of Membrane Science, 2004, 1-9.
John, et al., "Production of Electric Power by mixing Fresh and Salt Water in the Hydro-electric Pile", Nature Publishing Group, Oct. 2, 1954, pp. 660.
Kempener, et al., "Salinity Gradient Energy", Technology Brief, International Renewable Energy Agency, Jun. 2014, 1-28.
Kumbharkar, et al., "High performance polybenzimidazole based asymmetric hollow fibre membranes for H2/CO2 separation", Journal of Membrane Science 375, 2011, 231-240.
Li, et al., "Development and positron annihilation spectroscopy (PAS) characterization of polyamide imide (PAI)-polyethersulfone (PES) based defect-free dual-layer hollow fiber membranes with an ultrathin dense-selective layer for gas separation", Journal of Membrane Science 378, 2011, 541-550.
Liu, et al., "Characterization of morphology controlled polyethersulfone hollow fiber membranes by the addition of polyethylene glycol to the dope and bore liquid solution", Journal of Membrane Science, 2003, 187-199.
Logan, et al., "Membrane-based processes for sustainable power generation using water", Macmillan Publishers Limited, Aug. 16, 2012, 313-319.
Miao, et al., "Synthesis and characterization of high-performance novel thin film nanocomposite PRO membranes with tiered nanofiber support reinforced by functionalized carbon nanotubes", Journal of Membrane Science 486, 2015, 151-160.
Nhu-Ngoc, et al., "Hydrophilic Nanofibers as New Supports for Thin Film Composite Membranes for Engineered Osmosis", Environmental Science Technology, 2013, 1761-1769 .

(56) References Cited

OTHER PUBLICATIONS

Nunes, et al., "Membranes of poly(ether imide) and nanodispersed silica", Journal of Membrane Science, 1999, 219-226.

Osmotic Power, "A new and powerful renewable energy source?", Elsevier Science Ltd., Nov./Dec. 2003, 48-50.

Peng, et al., "Macrovoid evolution and critical factors to form macrovoid-free hollow fiber membranes", Journal of Membrane Science, 2008, 363-372.

Post, et al., "Salinity-gradient power: Evaluation of pressure-retarded osmosis and reverse electrodialysis", Journal of Membrane Science, 2007, 218-230.

Pravin, et al., "Preparation, characterization and performance evaluations of thin film composite hollow fiber membrane for energy generation", Desalination 345, 2014, 136-145.

Zhang, et al., "Substrate modifications and alcohol treatment on thin film composite membranes for osmotic power", Chemical Engineering Science 87, 2013, 40-50.

Schmidt, et al., "The Surface Tension and Density of Binary Hydrocarbon Mixtures:", The Journal of Physical Chemistry, Jun. 21, 1966, 3912-3916.

Zhen-Liang, et al., "Polymeric asymmetric membranes made from polyetherimide/poly-benzimidazole/poly (ethylene glycol) (PEI/PBI/PEG) for oil-surfactant-water separation", Journal of Membrane Science, 1999, 41-53.

Shuren, et al., "Robust and High performance hollow fiber membranes for energy harvesting from salinity gradients by pressure retarded osmosis", Journal of Membrane Science 448, 2013, 44-54.

Sivaraman, et al., "Solubility of C60, in Organic Solvents", J. Org. Chem., 1992, 6077-6079.

Tai-Shung, et al., "Emerging forward osmosis (FO) technologies and challenges ahead for clean water and clean energy applications", Science Direct, 2012, 246-257.

Tang, et al., "Effect of spinning conditions on the structure and performance of hydrophobic PVDF hollow fiber membranes for membrane distillation", Desalination 287, 2012, 326-339.

Thorsen, et al., "The potential for power production from salinity gradients by pressure retarded osmosis", Journal of Membrane Science 335, 2009, 103-110.

Vazquez, et al., Surface Tension of Alcohol + Water from 20 to 50 "C", J. Chem. Eng. Data, 1995, 611-614.

Wang, et al., "The effects of flow angle and shear rate within the spinneret on the separation performance of poly (ethersulfone) (PES) ultrafiltration hollow fiber membranes", Journal of Membrane Science, 2004, 67-79.

Wei-Chi, et al., "Novel interfacially-polymerized polyamide thin-film composite membranes: Studies on characterization, pervaporation, and positron annihilation spectroscopy", Polymer 52, 2011, 2414-2421.

Wei-Song, et al., "Characterizing Free Volumes and Layer Structures in Asymmetric Thin-Film Polymeric Membranes in the Wet Condition Using the Variable Monoenergy Slow Positron Beam", Marcomolecules Article, 2010, 6127-6134.

Xue, et al., "Deformation and reinforcement of thin-film composite (TFC) polyamide-imide (PAI) membranes for osmotic power generation", Journal of Membrane Science 434, 2013, 204-217.

Xue, et al., "Thin-Film Composite Membranes and Formation Mechanism of Thin-Film Layers on Hydrophilic Cellulose Acetate Propionate Substrates for Forward Osmosis Processes", I & EC Research, 2012, 10039-10050.

Search Report and Written Opinion for PCT/IB2016/053280, dated Aug. 2, 2016.

Orpen A.G., "Aqueous Solubility and Henry's Law Constants of Organic Compounds", CRC Press LLC, 2000, 3-256 through 3-258.

\* cited by examiner

US 10,654,003 B2

HOLLOW FIBER STRUCTURES, METHODS OF USE THEREOF, METHODS OF MAKING, AND PRESSURE-RETARDED PROCESSES

CROSS-REFERENCE TO RELATED APPLICATIONS

This application is a National Stage Application of PCT Application WO2016/193946, filed on Jun. 3, 2016, which claims the benefit of and priority to U.S. Provisional Application Ser. No. 62/170,297, having the title "HOLLOW FIBER STRUCTURES, METHODS OF USE THEREOF, METHODS OF MAKING, AND PRESSURE-RETARDED PROCESSES," filed on Jun. 3, 2015, the disclosure of which is incorporated herein by reference in its entirety.

BACKGROUND

Energy is one of the imperative global issues because of the escalating demand for, but depleting supplies of, fossil fuels. Numerous sustainable alternative energy resources have to be explored to alleviate the world's dependence on fossil fuels and lessen the negative environmental impact from their combustion. Recently, the renewable osmotic energy produced from the pressure-retarded osmosis (PRO) process has attracted great attention because of its huge energy potential, clean technique (zero carbon dioxide emission) and high stability as compared to solar or wind. This process harvests energy by exploiting the osmotic pressure gradient as a driving force across the membrane to induce water transport from the freshwater side towards the salty water side. The pressure built up within the salty water chamber can be released to spin an integrated turbine for electricity production.

One of the main barriers to commercialize the PRO process is the membrane because it is the heart of the entire process. To date, a commercially viable membrane able to sustain high pressures required for power production by the PRO process is not yet readily available. In literature during the past decade, PRO membranes have been developed in the configuration of inner-selective thin-film composite (TFC) hollow fiber membranes, where the thin selective film is formed on the lumen surface of the hollow fibers. In this way, the salty water is pressurized into the lumen side while the fresh water is circulated around the shell side of the fiber.

SUMMARY

Embodiments of the present disclosure provide for composite materials, methods of making composite materials, methods of using composite materials, and the like.

An embodiment of the present disclosure includes a composite material, among others, that includes: a hollow fiber having an inside layer and an outside layer, wherein the outside layer covers an outside surface of the inside layer, wherein the inside layer forms a boundary around the lumen, wherein the inside layer includes a bi-layer structure, wherein the bi-layer structure includes a sponge-like layer and a finger-like layer, wherein the sponge-like layer is disposed closer to the lumen of the hollow fiber and the finger-like layer is disposed on the sponge-like layer on the side opposite the lumen, wherein the outside layer includes a polyamide layer.

An embodiment of the present disclosure includes a pressure-retarded osmosis system, among others, that includes: a hollow fiber having an inside layer and an outside layer, wherein the outside layer covers an outside surface of the inside layer, wherein the inside layer includes a bi-layer structure, wherein the bi-layer structure includes a sponge-like layer and a finger-like layer, wherein the sponge-like layer is disposed closer to a lumen of the hollow fiber and the finger-like layer is disposed on the sponge-like layer on the side opposite the lumen, wherein the inside layer forms a boundary around the lumen, wherein the outside layer includes a polyamide layer.

Each of the embodiments described above and herein can include one or a combination of the following features: the inside layer is comprised of polyetherimide, the polyetherimide has the following formula: $(C_{37}H_{24}O_6N_2)_n$, wherein n is about 30 to 60, the polyamide layer is made from the reaction of the following components: aliphatic/aromatic diamines and diacid chloride, the sponge-like layer has an inner surface having a fully cellular structure, and its cross-sectional pore size is about 0.1 to 5 μm, the finger-like layer has a smooth outer surface with a mean pore size of about 5 to 15 nm, the finger-like layer has macrovoids, the macrovoids have a length of 30 to 60 μm and the width of 4 to 7 μm, the macrovoids have a boundary with the sponge-like layer and extend to a region about 5 to 15 μm from the outer surface, the polyamide layer has ridge-valley morphology with the surface nodule size of about 100 to 300 nm, the hollow fiber has an outside diameter of about 400 to 600 μm, the lumen has a diameter of about 250 to 300 μm, the bi-layer has a thickness of about 80 to 100 μm, the sponge-like layer has a thickness of about 30 to 45 μm, the finger-like layer has a thickness of about 50 to 70 μm, or the outside layer has a thickness of about 170 to 250 nm.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 3B shows qater flux, Jw, and salt reverse flux, Js, of outer-selective TFC hollow fiber membranes tested under the PRO mode where the active layer faces the draw solution without hydraulic pressure. The draw solution is 1 M NaCl. The feed solution is DI water.

(FIG. 4A) water flux and (FIG. 4B) power density as a function of pressure. The draw solution is 1 M NaCl. The feed solution is Dl water.

DETAILED DESCRIPTION

Figure 1:
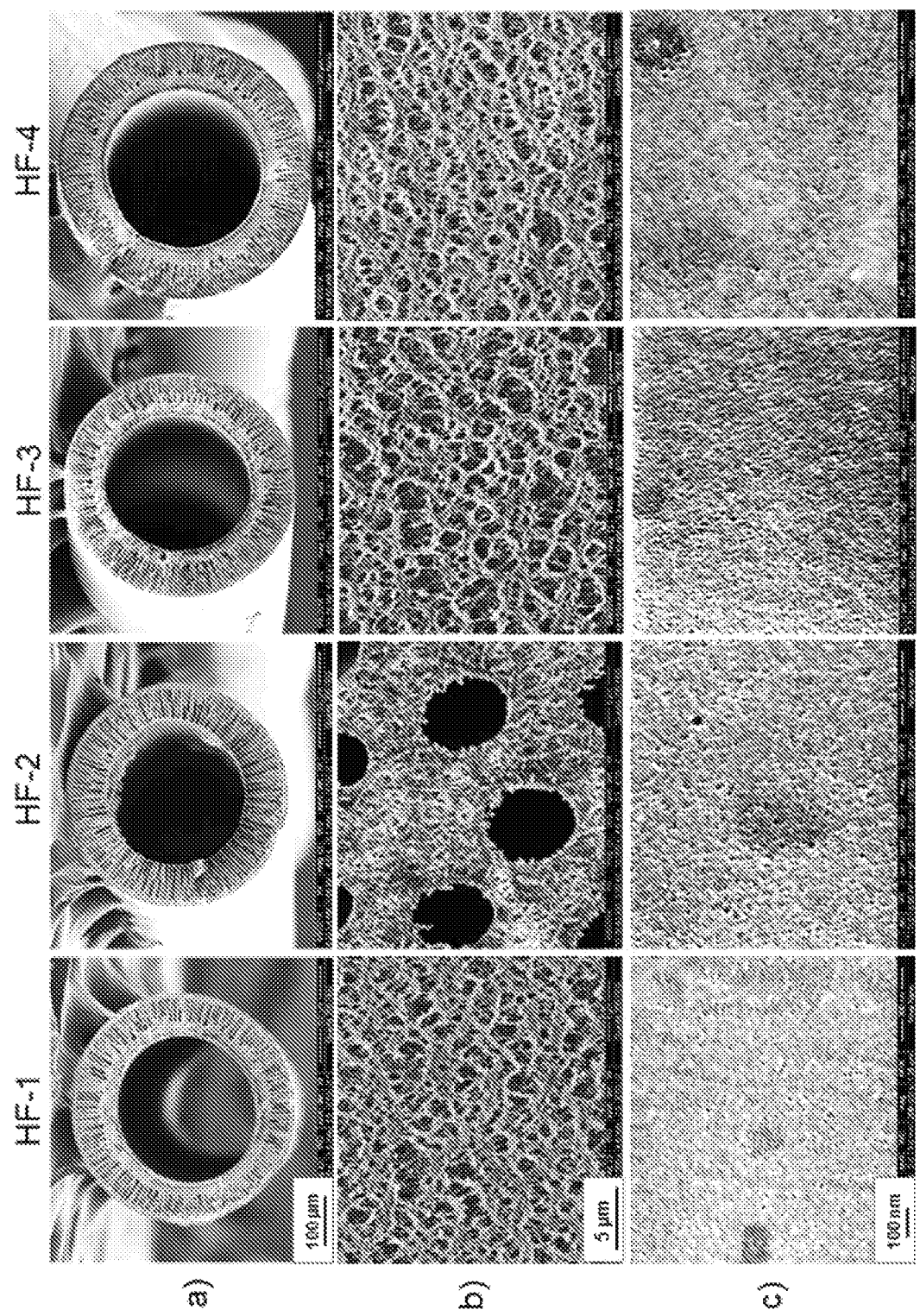
FIG. 1 shows the morphology of the hollow fiber supports used for fabricating the outer-selective PRO membranes: (row a) cross-section, (row b) inner surface, and (row c) outer surface.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of organic chemistry, biochemistry, microbiology, molecular biology, pharmacology, medicine, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

Renewable osmotic energy produced from the pressure-retarded osmosis (PRO) process has a large energy potential, clean technique (zero carbon dioxide emission) and is very stabile relative to other alternative energy sources. PRO can harvest energy by exploiting the osmotic pressure gradient as a driving force across a membrane between freshwater and salt water to induce water transport from the freshwater side towards the salty water side of the membrane. The pressure built up within the saltwater chamber can be released to produce energy, for example, to spin an integrated turbine for electricity production. However, current technologies are not commercially viable.

Embodiments of the present disclosure provide for composite materials, methods of making composite materials, methods of using composite materials, and the like. Embodiments of the present disclosure are advantageous in that they may overcome one or more of the present disadvantages of the current commercially available technologies.

An embodiment of the present disclosure includes a composite material that can be used as a PRO membrane. In an embodiment, the composite material is a hollow fiber having a lumen surrounded by an inner layer which is surrounded by an outside layer. In an implementation of an embodiment of the present disclosure, saltwater can be pressurized onto the outer surface of the outside layer while the fresh water is circulated into the lumen of the hollow fiber. An advantage of embodiments of the present disclosure is that the hollow fiber does not tend be blocked. In addition, the pressure drop is less during PRO operations as compared to other designs.

In an embodiment, the morphology and characteristics of hollow fiber can achieve good power density, has strong mechanical properties, low internal concentration polarization (ICP) for high pressure tolerance and low water flux drop, all at a commercially acceptable cost. An embodiment of the hollow fiber can tolerate about 17 bar with a peak power density of about 9.59 W/m$^2$.

An embodiment of the composite material includes a hollow fiber having an inside layer and an outside layer. The outside layer covers an outside surface of the inside layer. The inside layer forms a boundary around a lumen of the hollow fiber, where the lumen occupies the central core of the fiber along the length of the fiber. In an embodiment, the hollow fiber can have an outside diameter of about 400 to 600 μm. In an embodiment, the lumen can have a diameter of about 250 to 300 μm. In an embodiment, the outside layer can have a thickness of about 170 to 250 nm.

In an embodiment, the inside layer can be a polyetherimide, for example the polyetherimide can be $(C_{37}H_{24}O_6N_2)_n$, wherein n is about 30 to 60. In an embodiment, the inside layer includes a bi-layer structure. In an embodiment, the bi-layer structure includes a sponge-like layer and a finger-like layer. The sponge-like layer is disposed closer to the lumen of the hollow fiber and the finger-like layer is disposed on the sponge-like layer on the side opposite the lumen. FIG. 1 illustrates these structural features. In an embodiment, the bi-layer can have a thickness of about 80 to 100 μm. In an embodiment, the sponge-like layer can have a thickness of about 30 to 45 μm. In an embodiment, the finger-like layer can have a thickness of about 50 to 70 μm.

In an embodiment, the sponge-like layer can have an inner surface having a fully cellular structure. The sponge-like layer can have a cross-sectional pore size of about 0.1 to 5 μm. In an embodiment, the finger-like layer can have a smooth outer surface with mean pore size of about 5 to 15 nm. The finger-like layer can have macrovoids, where the macrovoids can have a length of 30 to 60 μm and a width of 4 to 7 μm. The macrovoids can have a boundary with the sponge-like layer and extend to a region about 5 to 15 μm from the outer surface.

The interfacial polymerization to form the outside layer can be carried out on the outer surface of the inside layer of the bi-layered structure (polyetherimide hollow fiber, e.g. Ultem® hollow fiber). Prior to this process in an embodiment, one end of the fibers were sealed with an epoxy, pre-wetted with alcohol and then stabilized in DI water. The fibers were consequently dipped in the aqueous amine solution and subsequently the fibers are immersed into the trimesoyl chloride (TMC) solution to carry out interfacial polymerization. After the reaction, the fibers are rinsed to remove excess monomers. Then, the sealed ends of the fibers were cut and the fibers were then immersed in a 25:75 (vol %) glycerol/water solution overnight, and finally dried in air. Additional details are provided in the Example.

In an embodiment, the outside layer can be a polyamide layer. In an embodiment, the polyamide layer is a cross-linked and branched polymeric network with the volume density of about 1 to 2 g/cm$^3$ or 1.2 to 1.8 g/cm$^3$. In an embodiment, the polyamide layer can have a ridge-valley surface morphology with the surface nodule size of 100 to 300 nm In an embodiment, the polyamide layer can be made from the reaction of the following components: aliphatic/aromatic diamines (e.g., piperazine, m-phenylenediamine and p-phenylenediamine) and diacid chloride (e.g., trimesoyl chloride, isophthaloyl chloride and 5-isocyanato-isophthaloyl chloride). In an embodiment the ratio of aliphatic/aromatic diamines to diacid chloride can be about 1 to 2 or about 3 to 1. In addition to the aliphatic/aromatic diamines and diacid chloride, other components such as alcohols (e.g., methanol, ethanol, 1-propanol and 2-propanol) in the aqueous phase can be used as well as n-hexane in the organic phase can be used to produce the polyamide.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE

The pressure-retarded osmosis (PRO) process is a green technique for power generation to respond the world's need of energy sustainability. In this study, we have developed the vital component of the process, i.e. membrane, in the configuration of the outer-selective thin-film composite (TFC) hollow fiber, which is more practical than other configurations. The support layer morphology and the formation of the selective polyamide layer have been optimized for a good PRO performance. The results show that the support with the mixed finger- and sponge-like structure is the most convenient one with efficiently strong mechanical properties and low internal concentration polarization (ICP) for a high pressure tolerance and low water flux drop. A simple alcohol-pre-wetting approach on the fiber support led to a smooth and thin polyamide layer, which is favorable for a high water flux and power density. The newly developed membranes can tolerate 17 bar with a peak power density of 9.59 W/m$^2$. This work provides useful database for the fabrication of suitable support morphology for power generation via PRO process as well as the improvement of the polyamide layer for TFC membranes.

Introduction

Energy is one of the imperative global issues because of the escalating demand but depleting supplies of fossil fuels[1]. Moreover, the negative environmental impacts of their combustion such as air and water pollution, and global warming emissions, have fostered scientists to explore numerous sustainable alternative energy resources[2]. Wind and solar power are two of the cleanest and most sustainable energy sources, as they produce no toxic pollution or global warming emissions. Both are well established and part of our all day life.

Recently, the renewable osmotic energy produced from the pressure-retarded osmosis (PRO) process has attracted great attention because of its huge energy potential (1750-2000 TWh/y)[3, 4], clean technique (zero carbon dioxide emission)[5-7] and high stability as compared to solar or wind[5]. This process harvests energy by exploiting the osmotic pressure gradient as a driving force across the membrane to induce water transport from the freshwater side towards the salty water side. The pressure built up within the salty water chamber can be released to spin an integrated turbine for electricity production[8].

One of the main barriers to commercialize the PRO process is the membrane because it is the heart of the entire process[9, 10]. Thus, the vital challenge of an efficiently osmotic power generation plant is the development of robust PRO membranes with (1) a strong and porous support to tolerate high-pressure operations with low internal concentration polarization (ICP), (2) a highly water-permeable and unfavorably salt-permeable selective layer to maximize power generation, and (3) anti-fouling properties to preserve membrane performance. To achieve these characteristics, thin film composite (TFC) membranes consisting of a porous support fabricated by phase inversion and a thin polyamide selective layer synthesized by interfacial polymerization, have been developed for PRO processes[11-18]. Common monomers used for interfacial polymerization are m-phenylene diamine (MPD) and trimesoyl chloride (TMC).

PRO membranes have two configurations; namely, flat-sheet and hollow fiber. Flat-sheet PRO membranes were utilized by Statkraft to build the first osmotic power pilot in 2009 for concept demonstration[19]. For practical applications, the hollow fiber configuration is of great interest due to its advantages of higher effective surface area per module, self-mechanical support, and ease of module fabrication. During the past decade, PRO TFC hollow fiber membranes have been developed in the manner that the thin selective film is formed on the lumen surface of the hollow fibers[11, 14-16, 18].

Recently, PRO TFC hollow fiber membranes with an outer selective layer have attracted attention from both academics and industries because of their less tendency to fiber blockage and less pressure drop during real PRO operations as compared to the inner selective ones[20, 21]. However, it is more challenging to develop the former than the latter because of two reasons. Firstly, very limited outer selective TFC hollow fiber membranes have been developed, there is no guideline on their support morphology with strong mechanical property and low ICP. Secondly, it is more complicated to deposit a defect-free polyamide layer on the outer surface than on the inner surface. In order to overcome this issue, Sun and Chung coated the fiber with dopamine as a cushion layer prior to the interfacial polymerization[21]. Because of strong adhesion and covalent bonding among dopamine, the polyimide support and the polyamide layer, the interaction between amine monomers and the support surface was improved and led to a more homogeneous and uniform polyamide layer. However, the instability of dopamine in the diamine solution made the process complicated.

This example describes an outer-selective TFC hollow fiber membranes for PRO applications by (1) studying the effects of different hollow fiber supports spun from various conditions on transport properties; (2) exploring and optimizing the morphology and characteristics of hollow fiber supports for outer-selective TFC hollow fiber membranes; and (3) improving the polyamide layer with better water flux and PRO performance by pre-wetting the support with alcohols. Although alcohol pre-wetting improves membrane's wetting ability[22, 23], there is no in-depth science for the selection of suitable alcohols and how different alcohols affect the fiber substrate and subsequent formation of the polyamide layer. Polyetherimide Ultem® was employed as the support material in this work because it has an excellent mechanical property for high-pressure operations[13, 22, 24]. We believe this work may provide useful database for the fabrication of suitable support morphology for power generation via PRO process as well as the improvement of the polyamide layer for PRO membranes.

Experimental

Fabrication of the Hollow Fiber Support

Ultem® hollow fiber supports were fabricated by a non-solvent-induced phase-inversion process with a dry jet wet spinning line as described elsewhere[25]. The detailed spinning conditions are listed in Table 2, supplemental discussion.

Interfacial Polymerization Process for Outer-Selective PRO TFC Hollow Fiber Membranes To fabricate TFC membranes, the aqueous phase was a MPD solution (2 wt % in water) and the organic phase was a trimesoyl chloride TMC solution (0.15 v/v % in hexane). The interfacial polymerization was carried out on the outer surface of the Ultem® hollow fiber substrates. Prior to this process, the supports were pre-wetted with alcohols in 20 s.

Characterizations

The morphology of hollow fiber supports and TFC membranes was observed by a field emission scanning electron microscope (FESEM, Quanta 200 or Nova Nano) and transmission electron microscopy (TEM, Tecnai Twin). The free volume of the polyamide layer and the mean depth profiles of the dual-layer hollow fibers were characterized by doppler broadening energy spectroscopy (DBES) using positron annihilation spectroscopy (PAS). More details on PAS principle is disclosed in the supplemental discussion. Other characterizations for the supports such as their collapse pressures, sorption behavior and pore structural properties; and those for the TFC membranes such as their reverse osmosis and forward osmosis evaluations are also described in the supplemental discussion.

PRO Performance

PRO tests were carried out using a lab-scale PRO setup, where a high-pressure pump (Hydra-cell) was employed to recirculate 1M NaCl solution at the shell side of the fibers at 0.2 Lmin$^{-1}$ under gradually increased pressure. A peristaltic pump (Cole-Palmer) was used to recirculate DI water at 0.017 Lmin$^{-1}$ at the lumen side of the fibers. The power density is calculated by the following equation:

$$W = J_w \Delta P \quad (1)$$

where $\Delta P$ is the hydraulic pressure difference across the membrane and $J_w$ is the water permeation flux.

Results and Discussion

Ultem® Hollow Fiber Support Characteristics

In order to explore the suitable morphology of hollow fiber supports for the development of outer-selective TFC membranes, various spinning parameters have been investigated as listed in Table 2, supplemental discussion. Among them, HF-1 is a control hollow fiber support while HF-2, HF-3 and HF-4 were spun from dopes with different bore fluid compositions, dope formulas and take-up speeds.

FIG. 1 compares the FESEM images of HF-1 and HF-2. HF-2 has a full finger-like structure where macrovoids start from the inner surface to near the outer surface, while HF-1 has a mixed sponge- and finger-like structure. As a result, HF-2 has an inhomogeneous inner surface consisting of large pores with sizes matching the tip of finger-like macrovoids. These pores play as transport channels for permeate across the hollow fibers and reduce ICP. In contrast, the inner surface of HF-1 has a fully cellular structure, which may provide mechanical support during high pressure operations. In addition, the outer surface of HF-2 is less smooth and has more pinholes than that of HF-1 due to the delayed demixing at the inner surface using a higher NMP concentration as the bore fluid[26-28]. As displayed in FIG. 7, both hollow fiber supports have surface pore sizes smaller than <50 nm and relatively narrow pore size distributions with a mean pore diameter $(\mu_p)$<15 nm and a geometric standard deviation $(\sigma_p)$ of about 1.65 (Table 1).

Table 1 shows that both HF-1 and HF-2 have high pure water permeance (PWP) of 524 and 952 Lm$^{-2}$h$^{-1}$/bar, respectively, while their corresponding collapse pressures are 15 and 11 bar. Since the substrate morphology determines the transport and mechanical properties of the resultant TFC membranes[14-18], these results indicate a trade-off existing between the PWP value of the substrates and the operation pressure of the resultant PRO membranes. A support comprising a full finger-like structure with a higher PWP may result in a PRO TFC membrane with a lower collapse pressure than that made from a support consisting of a mixed sponge- and finger-like structure.

Figure 8:
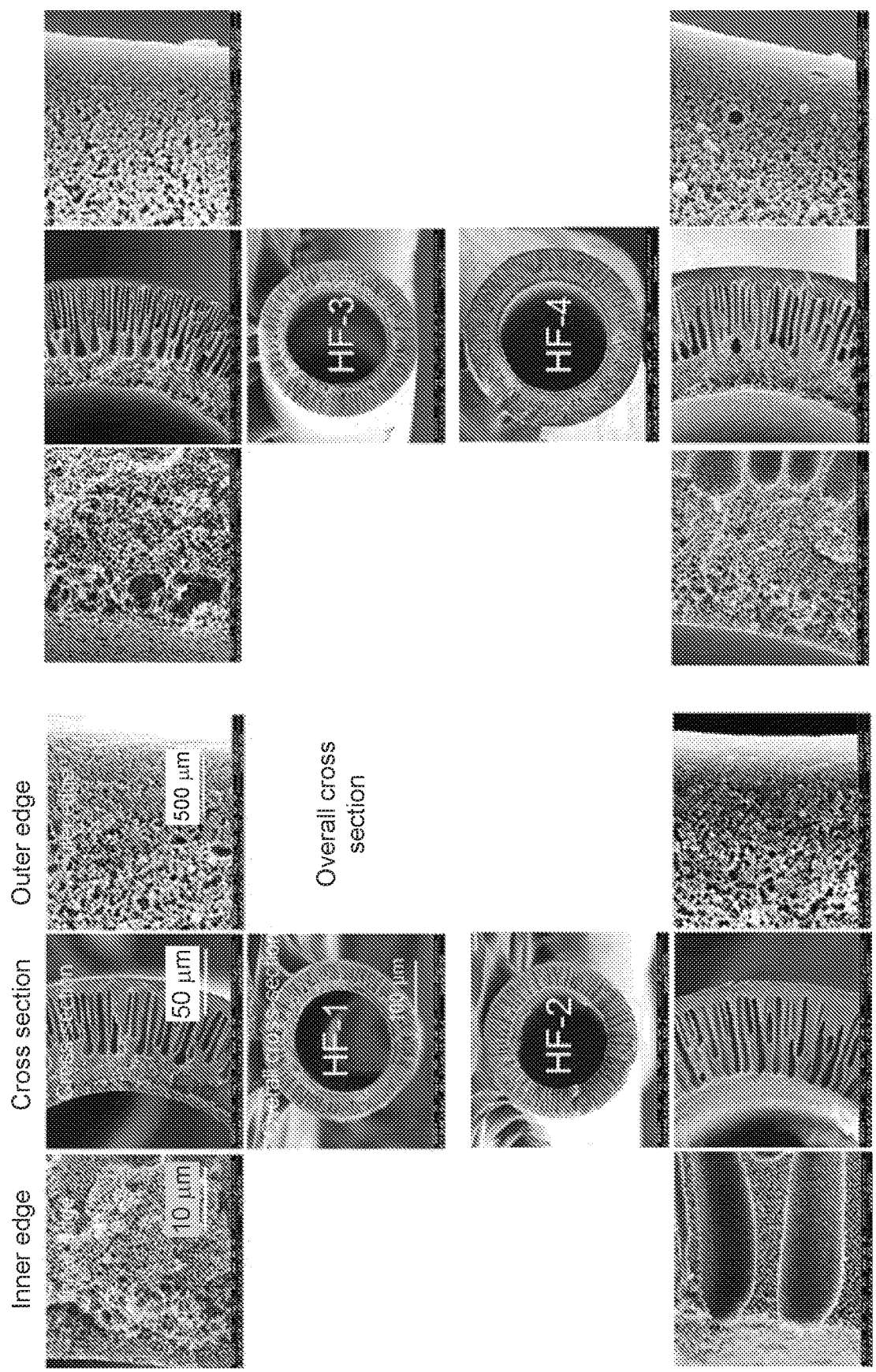
FIG. 8. Detailed morphology of the hollow fiber supports for preparing the outer-selective PRO membranes

In order to tailor the support towards high pressure tolerance for PRO applications, dope formula and take-up speed were further modified. A comparison between HF-1 and HF-3 in FIG. 1 shows that they have similar morphology, outer diameters, inner and outer surface structures. However, a higher magnification in FIG. 8 indicates that HF-3 has more and thinner finger-like macrovoids because of a smaller amount of DEG in its dope formula. The addition of ethylene glycol, diethylene glycol, polyethylene glycol or glycerol has been reported to improve pore formation, suppress macrovoid formation and transfer the membrane morphology from the finger-like to sponge-like structure[29-31]. As a result, HF-3 spun from a smaller amount of DEG in its dope has a higher number of finger-like macrovoids with finer macrovoid channels. Additionally, compared to HF-1, HF-4 has a similar morphology but a larger outer diameter of 527 nm and a thicker fiber wall of 97 nm, due to a smaller elongational stress applied on the nascent fiber because of using a lower take-up speed[32-35].

Figure 7:
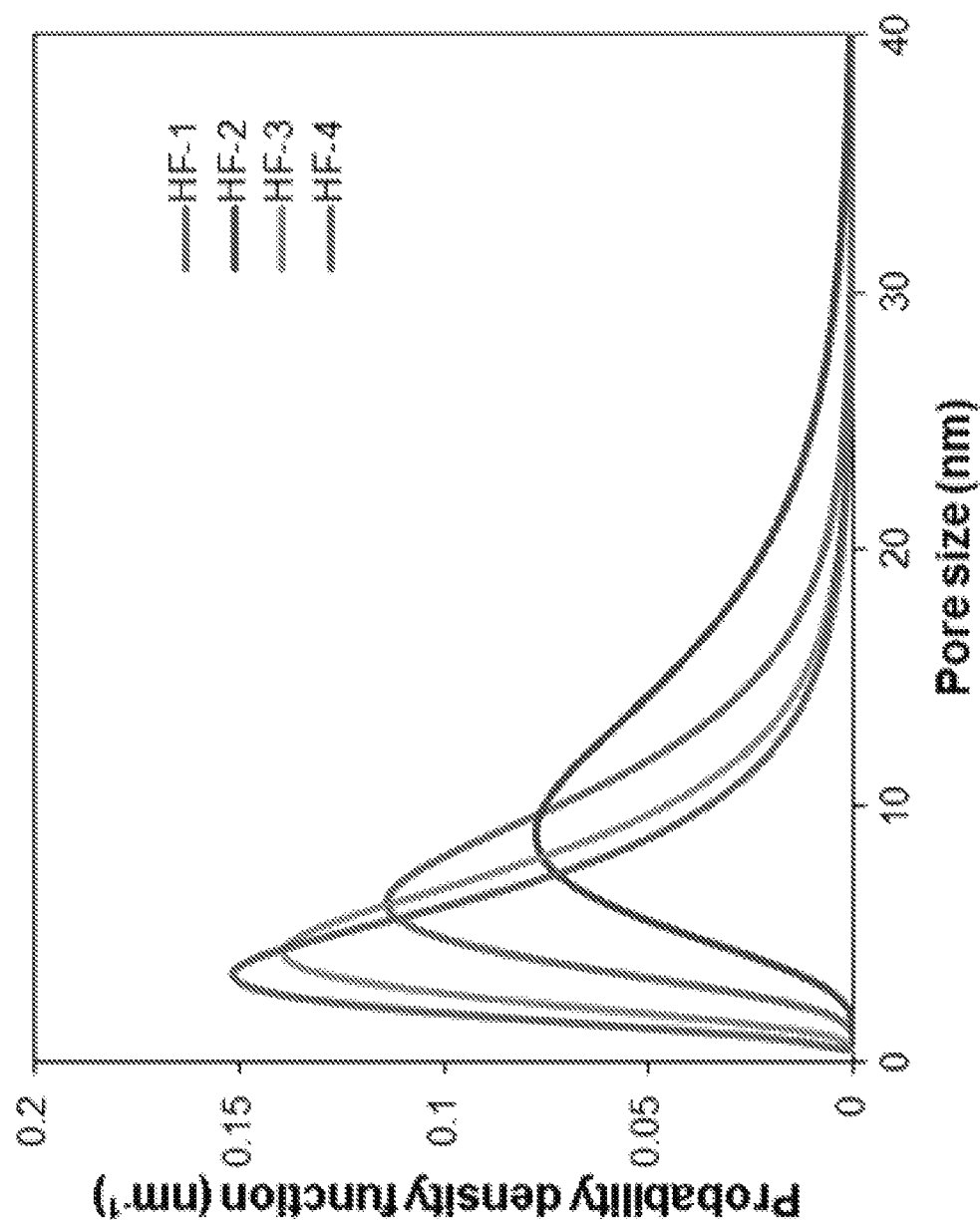
FIG. 7 is a graph of pore size distributions of the Ultem® hollow fiber supports.

These morphological changes render HF-3 and HF-4 to be mechanically stronger with higher collapse pressures of 18 and 17 bar, respectively (Table 1). Table 1 and FIG. 7 show that the PWP values of HF-3 and HF-4 drop to 131 and 270 $Lm^{-2}h^{-1}$/bar, respectively, while their mean pore diameters ($\mu_p$) decrease to about 5.5 nm with geometric standard deviations ($\sigma_p$) of about 1.80 because of less porous top surface and overall structure. Compared to HF-1 and HF-2, HF-3 and HF-4 have better surfaces for interfacial polymerization because of smaller mean pore diameters[36-38].

Outer Selective TFC Hollow Fiber Membranes

Figure 2:
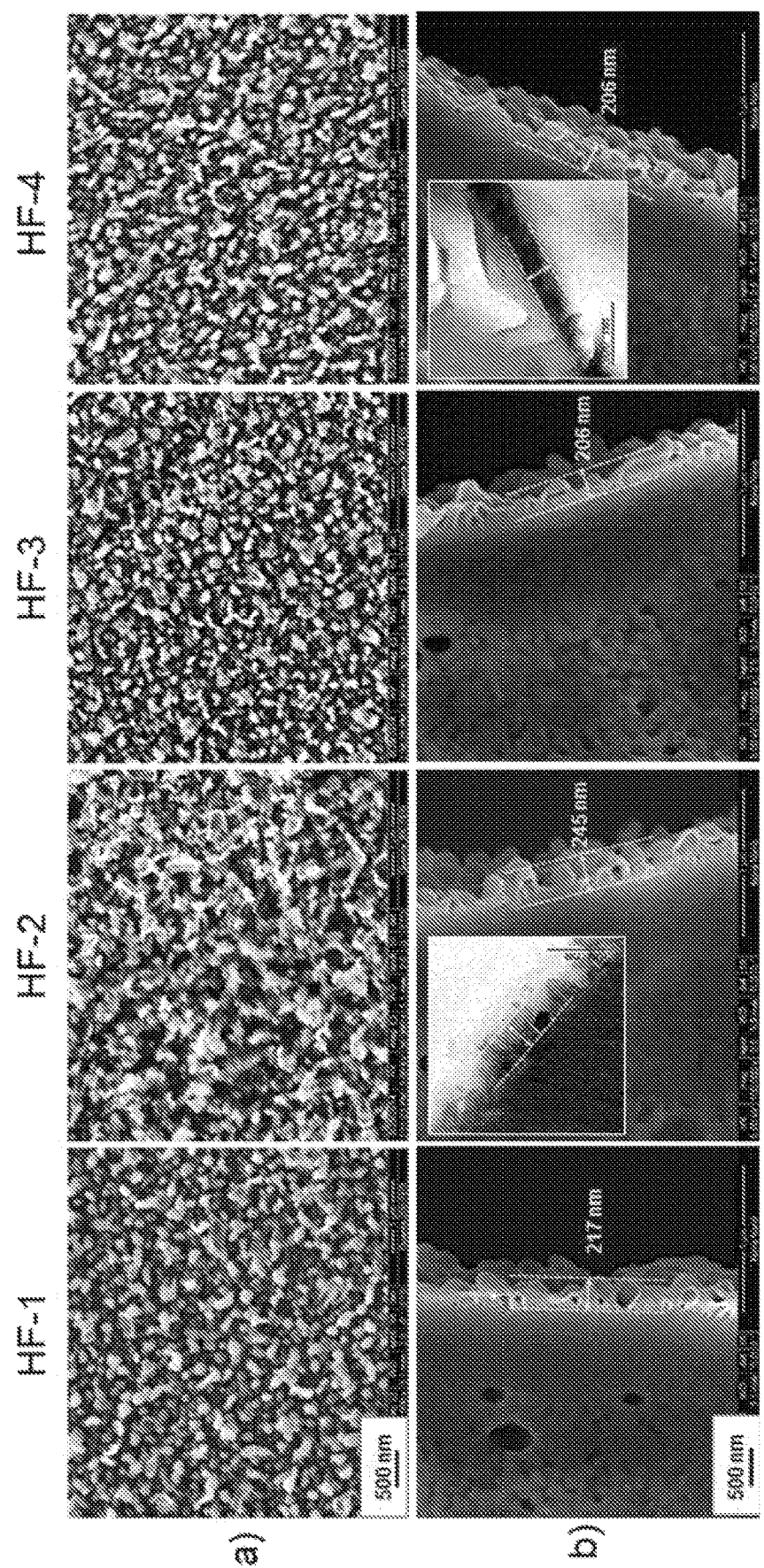
FIG. 2 shows images of the (row a) outer surface and (row b) outer edge morphology of outer-selective TFC hollow fiber membranes prepared from different supports (FESEM images; insets are TEM images).

FIG. 2 shows the FESEM surface images of PRO TFC membranes after conducting interfacial polymerization on the ethanol-pre-wetted hollow fiber supports. A thin polyamide layer with rough ridge-valley morphology was observed. Among these four hollow fibers, HF-1, HF-3 and HF-4 have a smooth and homogeneous polyamide layer with a thickness of about 210 nm, while HF-2 has a rougher and thicker polyamide layer with a thickness of about 245 nm. However, the water permeance for HF-2 is the highest among these hollow fibers. The polyamide layer morphology was then investigated in more details by TEM and the free volume was estimated by PAS. The TEM images are shown as insets in FIG. 2. They confirm that the polyamide layer of the HF-2 TFC membrane is rougher than that of the HF-4 TFC membrane and their thicknesses are consistent with those estimated from FESEM images.

Figure 3A:
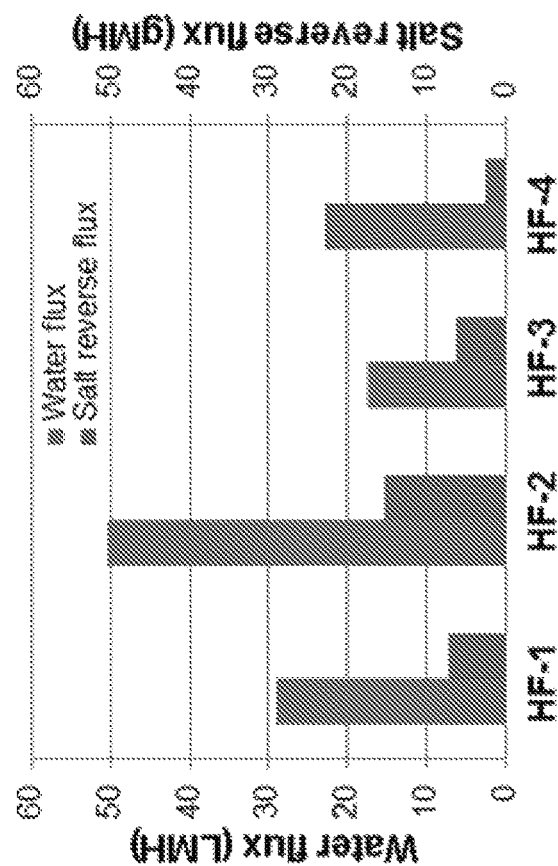
FIGS. 3A-B are graphs of (FIG. 3A) water permeance, A, and salt permeance, B, of outer-selective TFC hollow fiber membranes tested under the RO mode using a constant pressure of 1 bar and a NaCl concentration of 200 ppm.
Figure 9:
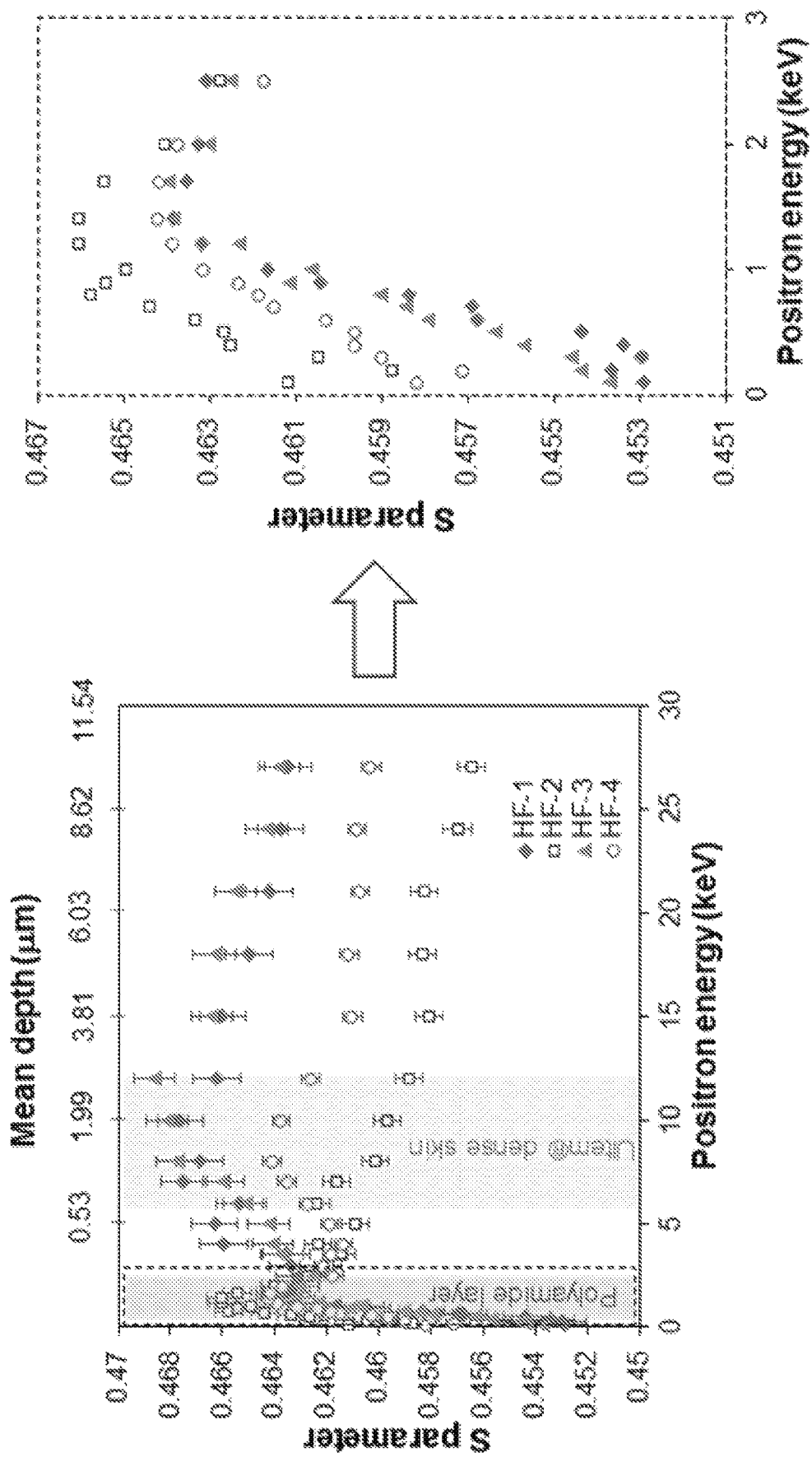
FIG. 9 illustrates the S parameter as a function of position incident energy of TFC hollow fiber membranes prepared from different supports.

To compare the free volume and detailed structure of the polyamide layers formed on different supports, PAS experiments, coupled with a monoenergetic slow positron beam, were performed. FIG. 9 shows the S parameter versus positron incident energy (or mean depth) for the TFC membranes, the patterns of which are consistent with previous studies for the TFC membranes made of other support materials[39, 40]. The peak-like regions in the positron incident energy from 0.7 keV to 2.0 keV and from 7.0 keV to 12 keV correspond to the polyamide layer and the dense skin of the Ultem® support, respectively. Variations in S parameter reflect the free volume change in the membrane. The S parameter is the highest for the polyamide layer of the TFC HF-2 membrane, which indicates that its free volume is the highest. The largest free volume justifies the highest water permeance and the lowest NaCl rejection of 46.2% (a corresponding salt permeance B of 5.3 $Lm^{-2}h^{-1}$) observed for this TFC HF-2 membrane under the RO mode, as shown in FIG. 3A. The S parameters of the polyamide layers are nearly similar for other 3 TFC membranes.

Figure 3B:

For other 3 TFC membranes, their PWP values under the RO mode are in the order of HF-1>HF-4>HF-3 which follows exactly the PWP order of their supports. Because their polyamide layers have a similar structure and thickness, the PWP order of these TFC membranes is mainly governed by the supports. FO experiments were also carried out using a cross-flow system under the PRO mode. As shown in FIG. 3B, the water flux follows the PWP order of HF-2>HF-1>HF-4>HF-3 in the range of 17.4 to 50.3 $Lm^{-2}h^{-1}$.

Figure 4A:
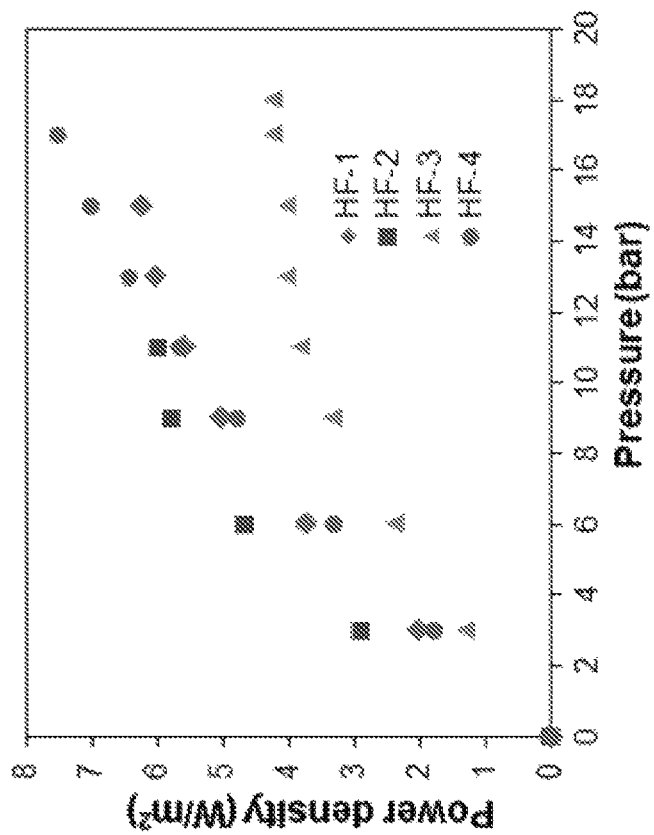
FIGS. 4A-B illustrate PRO performance of outer-selective TFC hollow fiber membranes.
Figure 4B:
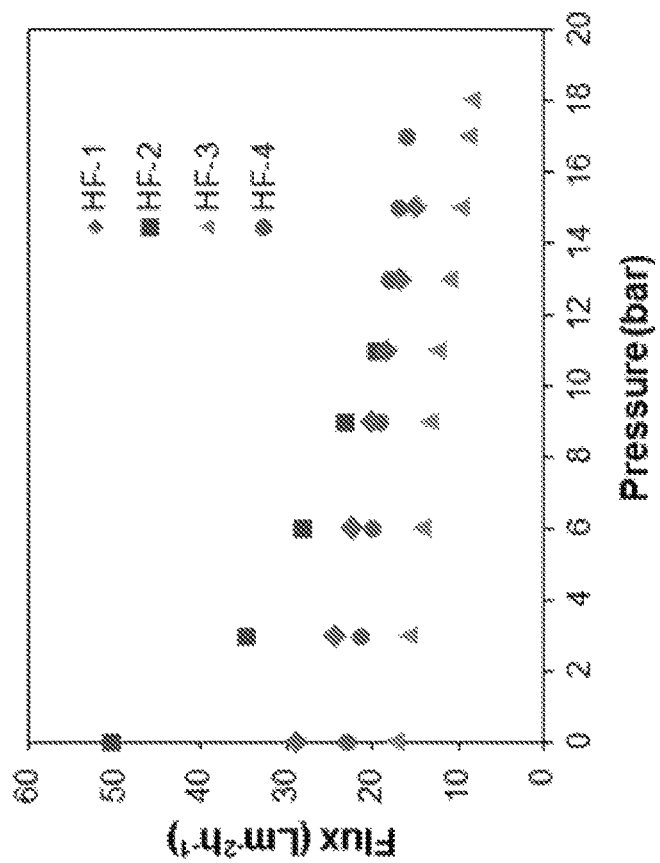

The TFC membranes were further evaluated by high-pressure PRO experiments. As shown in FIGS. 4A-B, even though the initial water flux of the TFC HF-2 membrane is very high, it drops rapidly under high pressures and nearly has a similar value with those of TFC HF-1 and HF-4 membranes at the applied pressure of 11 bar. The quick flux decrease of the TFC HF-2 membrane is due to two reasons. Firstly, its high salt permeance not only reduces the effective osmotic driving force across the membrane but also induces server ICP. Secondly, since its polyamide layer was formed on large-sized pores (FIG. 1), it may be deformed under high pressures and become defective with worsen ICP and flux. In contrast, the other three TFC membranes exhibit a similar flux decreasing pattern with applied pressure.

As implied from eq. 1, the power density is a product of pressure difference and flux obtained at that pressure. FIGS. 4A-B show that the TFC HF-2 membrane has a high initial water flux but a low peak power density of 5.96 $W/m^2$ because of the rapid flux decline with pressure and low collapse pressure. The TFC HF-3 membrane has the lowest power density of 4.25 $W/m^2$ due to its smallest initial flux of 17.4 $Lm^{-2}h^{-1}$. Among the four TFC membranes, the TFC HF-4 membrane has the highest peak power density of 7.51 $W/m^2$ because of its combination of high pressure tolerance, reasonably high initial flux and low ICP. In conclusion, the supports with a mixed finger-like and sponge-like structure are more favorable than the one with a full finger-like structure for the PRO process. Since the HF-4 support has resulted in the best PRO TFC membrane, it was chosen for further investigation.

Enhancing PRO Performance Through Alcohol Pre-Wetting on the Support

Figure 5:
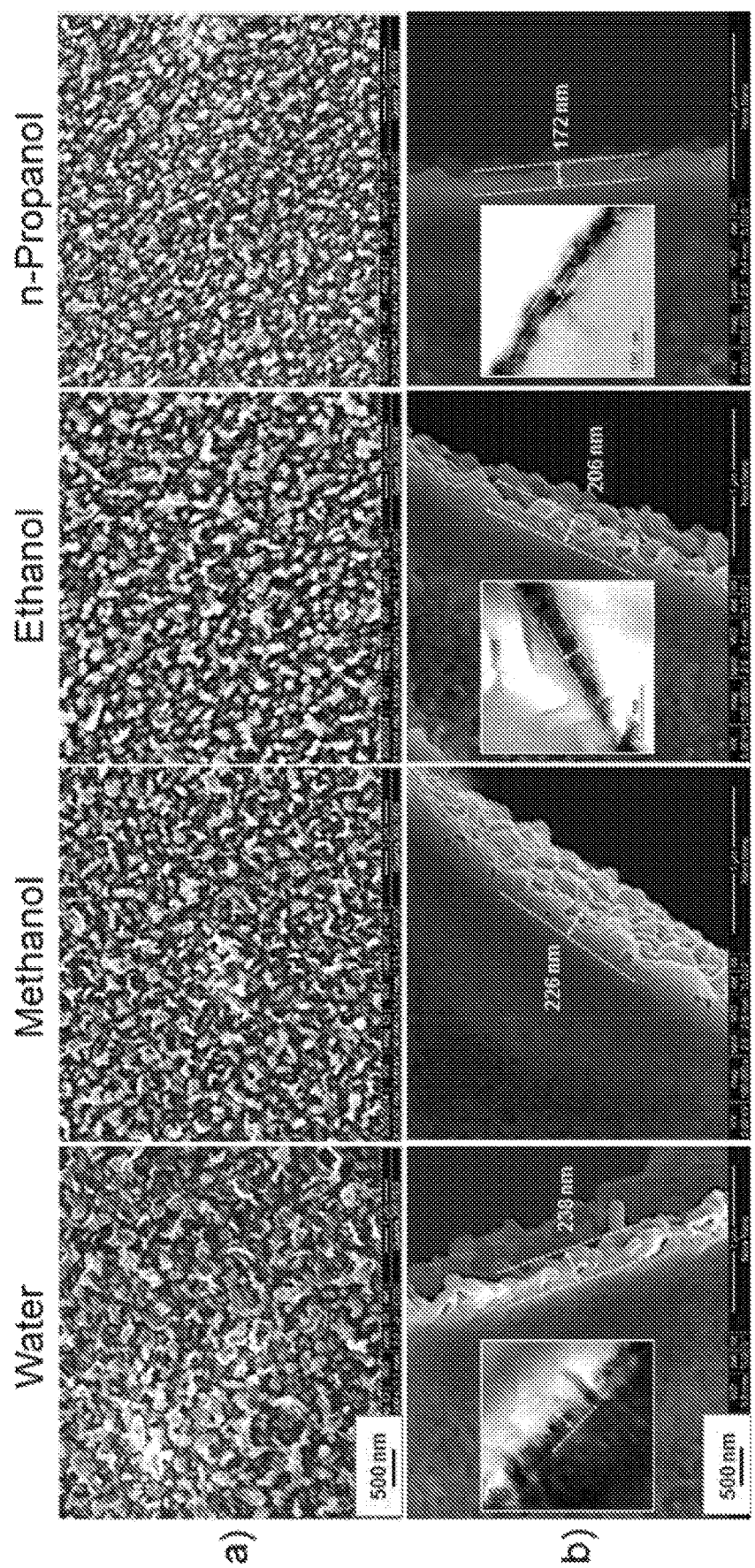
FIG. 5 shows images of the outer surface (row a) and outer-edge (row b) morphology of outer-selective TFC hollow fiber membranes prepared from the supports pre-wetted with water, methanol, ethanol and n-propanol (FESEM images, TEM images).
Figure 10:
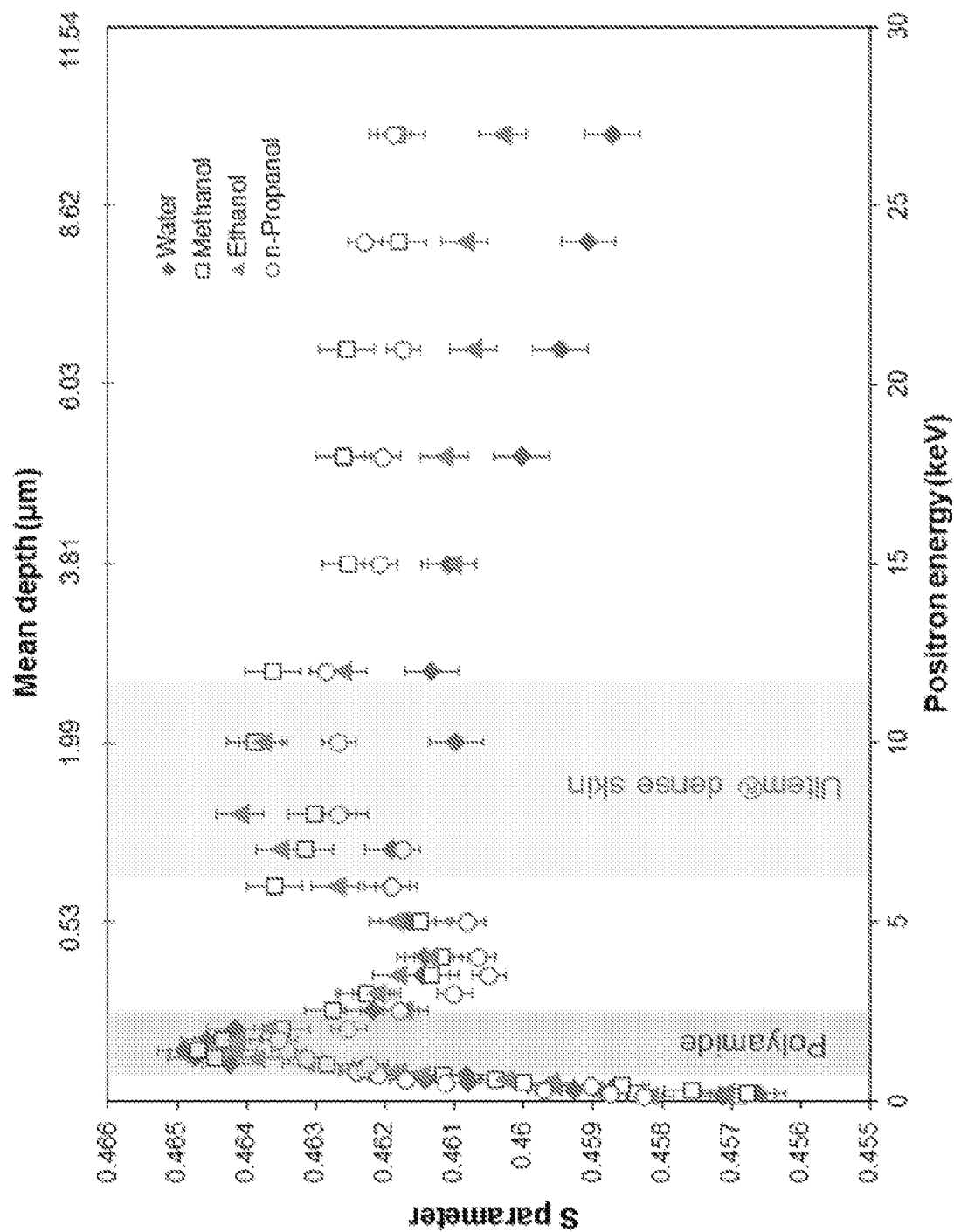
FIG. 10 illustrates the S parameter as a function of position incident energy of TFC hollow fiber membranes prepared from the HF-4 supports pre-wetted with water and alcohols

In order to improve PRO performance, three types of alcohol pre-wetting were conducted on hollow fiber substrates before interfacial polymerization. Table 3 summarizes the physicochemical properties of these three alcohols, water and n-hexane as well as the substrate material Ultem®. FIG. 5 shows FESEM images of the polyamide layer formed on the HF-4 supports pre-wetted by water and different alcohols. The polyamide layer formed on the water-pre-wetted support has a rough ridge-valley surface with a large thickness of 238 nm. When the supports are pre-wetted by alcohols, the polyamide layers become thinner with smaller nodules and smoother surfaces. The insets in FIG. 5 show their TEM images and confirm that the water-pre-wetted TFC membrane has a rougher polyamide layer than those of alcohol-pre-wetted TFC membranes. Because of the greater darkness, the TEM images also indicate that the polyamide layer of the alcohol-pre-wetted TFC membranes has a higher density, which is consistent with PAS observation. As shown in FIG. 10, the S parameter curve is higher for the polyamide layer of the water-pre-wetted TFC membrane than those of alcohol-pre-wetted TFC membranes, which indicates the former has a higher free volume or less dense structure than the latter.

The benefits of pre-wetting the support with alcohols can be understood from three aspects. Firstly, compared to water, alcohols have lower surface energy and closer solubility parameters with Ultem®. As a result, alcohol pre-wetting facilitates substrate pores more accessible to the aqueous solution and the MPD monomer would be more uniformly distributed inside the support, leading to form a more homogeneous and thinner polyamide layer[36]. Secondly, alcohols may slightly swell up the substrate and reduce its pore sizes. As a consequence, the transport of MPD toward TMC during interfacial polymerization is less turbulent and results in a smoother polyamide layer[37]. Thirdly, alcohols also affect the interfacial tension between the organic and aqueous phases. Without alcohols the interfacial tension between the aqueous (72.01 $mNm^{-1}$ for water) and organic solutions (17.94 $mNm^{-1}$ for n-hexane) is high, the polymerization between TMC and MPD occurs only at the interface of the two solutions. When the support is pre-wetted with alcohols, the residual alcohols may decrease their interfacial tension, improve monomer transports and enhance the polymerization.

FIG. 5 (row b) also shows that the polyamide thickness is in the order of water>methanol>ethanol>n-propanol, which is in agreement with the trend of their S parameters (i.e., free volume) as displayed in FIG. 10. Since the solubility parameter is in the order of water>methanol>ethanol>1-propanol≈Ultem®, n-propanol has the best interaction with the Ultem® hollow fiber. This explains why n-propanol pre-wetting produces the thinnest and smoothest polyamide layer. To prove the interaction between Ultem® and water or alcohols, sorption tests were carried out using Ultem® flat-sheet substrates. As shown in FIG. 11A, the sorption data absolutely follow the prediction from their solubility parameters. In addition, the sorption amount of n-propanol after 17 days is almost equal to that after 7 days while those of methanol and ethanol sorption increase 20 and 24%, respectively. This implies that Ultem® absorbs n-propanol faster than methanol and ethanol which make its equilibrium reach in a shorter time.

Figure 6:
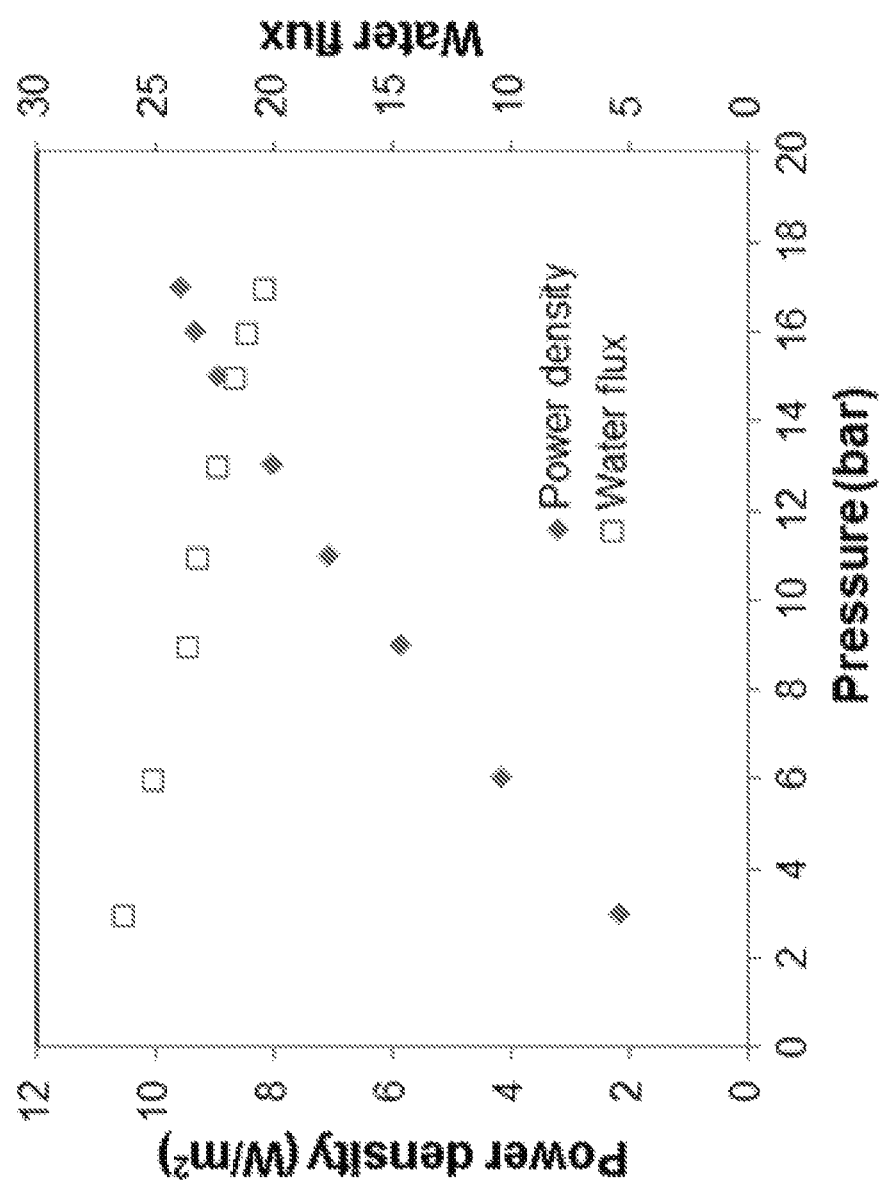
FIG. 6 illustrates PRO performance of the outer-selective TFC hollow fiber membranes prepared from n-propanol pre-wetted HF-4 support: water flux and power density as a function of pressure. The draw solution is 1 M NaCl. The feed solution is Dl water.
Figure 11B:
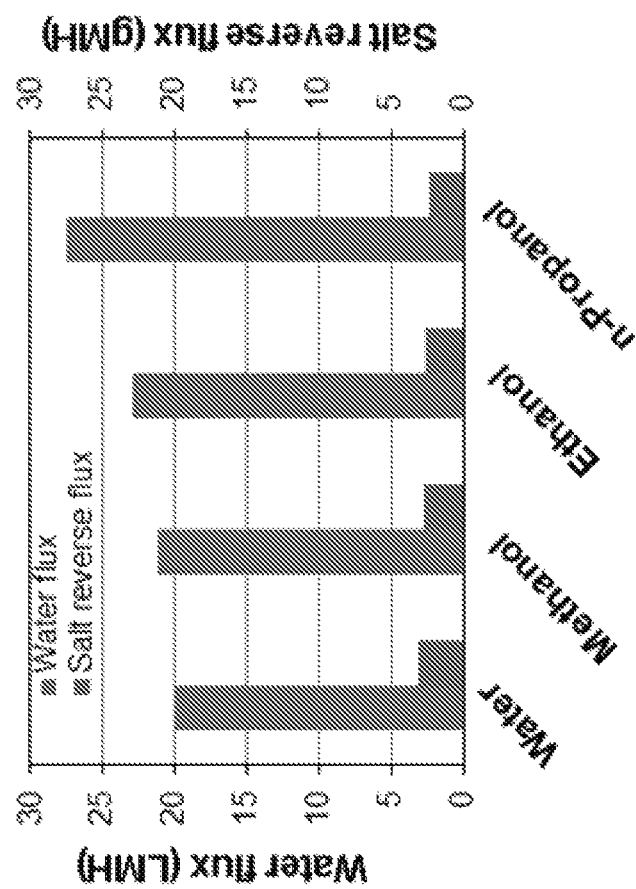
FIG. 11B illustrates the water flux, Jw, and salt reverse flux, Js, of outer-selective TFC hollow fiber membranes prepared from the HF-4 supports pretreated with different solvents, tested in FO experiments with the active layer facing draw solution mode without hydraulic pressure. The draw solution is 1 M NaCl. The feed solution is DI water
Figure 11A:
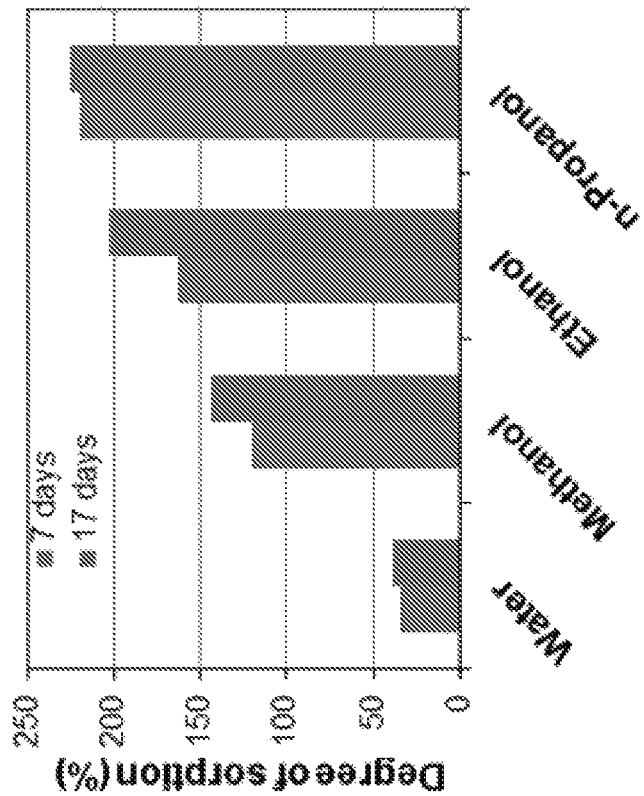
FIG. 11A illustrates the degree of sorption of the HF-4 fiber analogous flat-sheet supports in different solvents at room temperature.

FIG. 11B compares the FO performance of these TFC membranes. Consistent with SEM, TEM and PAS data, the water flux increases while the salt reverse flux decreases in the order of pre-wetting agents of water, methanol, ethanol and 1-propanol. Since the n-propanol-pre-wetted TFC membrane displays the best FO performance, it was tested under PRO for power generation. As illustrated in FIG. 6, its flux decreases 26% to 20.3 $Lm^{-2}h^{-1}$ at the maximal pressure tolerance of 17 bar. The obtained peak power density is 9.59 $W/m^2$ which surpasses other outer-selective PRO TFC hollow fibers made of Matrimid®[21] and PBI hollow fibers made from phase inversion[21, 41]. Since Ultem® is cheaper than Matrimid® and PBI, it may have greater potential for commercialization. Further works will focus on fouling studies and long-term stability.

REFERENCES (1) Administration, U. S. E. I. *Annual Energy Outlook* 2014; Washington, U.S, April 2014, 2014.
(2) Logan, B. E.; Elimelech, M., Membrane-based processes for sustainable power generation using water. *Nature* 2012, 488, (7411), 313-319.
(3) Post, J. W.; Veerman, J.; Hamelers, H. V.; Euverink, G. J.; Metz, S. J.; Nymeijer, K.; Buisman, C. J., Salinity-gradient power: Evaluation of pressure-retarded osmosis and reverse electrodialysis. *Journal of Membrane Science* 2007, 288, (1), 218-230.
(4) Thorsen, T.; Holt, T., The potential for power production from salinity gradients by pressure retarded osmosis. *Journal of Membrane Science* 2009, 335, (1), 103-110.
(5) Aaberg, R. J., Osmotic power: a new and powerful renewable energy source? *Refocus* 2003, 4, (6), 48-50.
(6) Gerstandt, K.; Peinemann, K.-V.; Skilhagen, S. E.; Thorsen, T.; Holt, T., Membrane processes in energy supply for an osmotic power plant. *Desalination* 2008, 224, (1), 64-70.
(7) Skilhagen, S. E., Osmotic power—a new, renewable energy source. *Desalination and water treatment* 2010, 15, (1-3), 271-278.
(8) Pattle, R., Production of electric power by mixing fresh and salt water in the hydroelectric pile. *Nature* 1954 174, 660-662.
(9) Chung, T. S.; Li, X.; Ong, R. C.; Ge, Q.; Wang, H.; Han, G., Emerging forward osmosis (FO) technologies and challenges ahead for clean water and clean energy applications. *Current Opinion in Chemical Engineering* 2012, 1, (3), 246-257.
(10) Kempener, R.; Neumann, F. *Salinity Gradient Energy—Technology Brief*; IRENA, Bonn, Germany, 2014.
(11) Arena, J. T.; McCloskey, B.; Freeman, B. D.; McCutcheon, J. R., Surface modification of thin film composite membrane support layers with polydopamine: enabling use of reverse osmosis membranes in pressure retarded osmosis. *Journal of Membrane Science* 2011, 375, (1), 55-62.
(12) Bui, N. N.; McCutcheon, J. R., Hydrophilic nanofibers as new supports for thin film composite membranes for engineered osmosis. *Environmental science & technology* 2013, 47, (3), 1761-1769.
(13) Chou, S.; Wang, R.; Fane, A. G., Robust and High performance hollow fiber membranes for energy harvesting from salinity gradients by pressure retarded osmosis. *Journal of Membrane Science* 2013, 448, 44-54.
(14) Han, G.; Wang, P.; Chung, T. S., Highly robust thin-film composite pressure retarded osmosis (PRO) hollow fiber membranes with high power densities for renewable salinity-gradient energy generation. *Environmental science & technology* 2013, 47, (14), 8070-8077.
(15) Han, G.; Zhang, S.; Li, X.; Chung, T. S., High performance thin film composite pressure retarded osmosis (PRO) membranes for renewable salinity-gradient energy generation. *Journal of Membrane Science* 2013, 440, 108-121.
(16) Li, X.; Zhang, S.; Fu, F.; Chung, T. S., Deformation and reinforcement of thin-film composite (TFC) polyamide-imide (PAI) membranes for osmotic power generation. *Journal of Membrane Science* 2013, 434, 204-217.
(17) Song, X.; Liu, Z.; Sun, D. D., Energy recovery from concentrated seawater brine by thin-film nanofiber composite pressure retarded osmosis membranes with high power density. *Energy & Environmental Science* 2013, 6, (4), 1199-1210.
(18) Zhang, S.; Chung, T. S., Minimizing the instant and accumulative effects of salt permeability to sustain ultra-high osmotic power density. *Environmental science & technology* 2013, 47, (17), 10085-10092.
(19) Skilhagen, S. E.; Dugstad, J. E.; Aaberg, R. J., Osmotic power—power production based on the osmotic pressure difference between waters with varying salt gradients. *Desalination* 2008, 220, (1), 476-482.
(20) Sivertsen, E.; Holt, T.; Thelin, W.; Brekke, G., Pressure retarded osmosis efficiency for different hollow fibre membrane module flow configurations. *Desalination* 2013, 312, 107-123.
(21) Sun, S. P.; Chung, T. S., Outer-selective pressure-retarded osmosis hollow fiber membranes from vacuum-assisted interfacial polymerization for osmotic power generation. *Environmental science & technology* 2013, 47, (22), 13167-13174.
(22) Nagendran, A.; Mohan, D. R., Cellulose acetate and polyetherimide blend ultrafiltration membranes: II. Effect of additive. *Polymers for Advanced Technologies* 2008, 19, (1), 24-35.
(23) Zhang, S.; Fu, F.; Chung, T. S., Substrate modifications and alcohol treatment on thin film composite membranes for osmotic power. *Chemical Engineering Science* 2013, 87, 40-50.
(24) Nunes, S.; Peinemann, K.; Ohlrogge, K.; Alpers, A.; Keller, M.; Pires, A., Membranes of poly (ether imide) and nanodispersed silica. *Journal of Membrane Science* 1999, 157, (2), 219-226.
(25) Zuo, J.; Wang, Y.; Chung, T. S., Novel organic-inorganic thin film composite membranes with separation

(26) Kumbharkar, S.; Liu, Y.; Li, K., High performance polybenzimidazole based asymmetric hollow fibre membranes for $H_2/CO_2$ separation. *Journal of Membrane Science* 2011, 375, (1), 231-240.

(27) Qin, J. J.; Chung, T. S., Effects of orientation relaxation and bore fluid chemistry on morphology and performance of polyethersulfone hollow fibers for gas separation. *Journal of membrane science* 2004, 229, (1), 1-9.

(28) Xu, Z. L.; Chung, T. S.; Loh, K. C.; Lim, B. C., Polymeric asymmetric membranes made from polyetherimide/polybenzimidazole/poly (ethylene glycol)(PEI/PBI/PEG) for oil-surfactant-water separation. *Journal of membrane science* 1999, 158, (1), 41-53.

(29) Aroon, M.; Ismail, A.; Montazer-Rahmati, M.; Matsuura, T., Morphology and permeation properties of polysulfone membranes for gas separation: effects of non-solvent additives and co-solvent. *Separation and Purification Technology* 2010, 72, (2), 194-202.

(30) Liu, Y.; Koops, G.; Strathmann, H., Characterization of morphology controlled polyethersulfone hollow fiber membranes by the addition of polyethylene glycol to the dope and bore liquid solution. *Journal of Membrane Science* 2003, 223, (1), 187-199.

(31) Song, Z. W.; Jiang, L. Y., Optimization of morphology and performance of PVDF hollow fiber for direct contact membrane distillation using experimental design. *Chemical Engineering Science* 2013, 101, 130-143.

(32) Bonyadi, S.; Chung, T. S.; Krantz, W. B., Investigation of corrugation phenomenon in the inner contour of hollow fibers during the non-solvent induced phase-separation process. *Journal of membrane science* 2007, 299, (1), 200-210.

(33) Chou, W. L.; Yang, M. C., Effect of take-up speed on physical properties and permeation performance of cellulose acetate hollow fibers. *Journal of membrane science* 2005, 250, (1), 259-267.

(34) Peng, N.; Chung, T. S.; Wang, K. Y., Macrovoid evolution and critical factors to form macrovoid-free hollow fiber membranes. *Journal of Membrane Science* 2008, 318, (1), 363-372.

(35) Tang, Y.; Li, N.; Liu, A.; Ding, S.; Yi, C.; Liu, H., Effect of spinning conditions on the structure and performance of hydrophobic PVDF hollow fiber membranes for membrane distillation. *Desalination* 2012, 287, 326-339.

(36) Ghosh, A. K.; Hoek, E. M., Impacts of support membrane structure and chemistry on polyamide-polysulfone interfacial composite membranes. *Journal of Membrane Science* 2009, 336, (1), 140-148.

(37) Li, X.; Wang, K. Y.; Helmer, B.; Chung, T. S., Thin-film composite membranes and formation mechanism of thin-film layers on hydrophilic cellulose acetate propionate substrates for forward osmosis processes. *Industrial & Engineering Chemistry Research* 2012, 51, (30), 10039-10050.

(38) Kong, C.; Kanezashi, M.; Yamomoto, T.; Shintani, T.; Tsuru, T., Controlled synthesis of high performance polyamide membrane with thin dense layer for water desalination. *Journal of Membrane Science* 2010, 362, (1), 76-80.

(39) Chao, W. C.; Huang, S. H.; An, Q.; Liaw, D. J.; Huang, Y. C.; Lee, K. R.; Lai, J. Y., Novel interfacially-polymerized polyamide thin-film composite membranes: studies on characterization, pervaporation, and positron annihilation spectroscopy. *Polymer* 2011, 52, (11), 2414-2421.

(40) Zuo, J.; Wang, Y.; Sun, S. P.; Chung, T. S., Molecular design of thin film composite (TFC) hollow fiber membranes for isopropanol dehydration via pervaporation. *Journal of Membrane Science* 2012, 405, 123-133.

(41) Fu, F. J.; Sun, S. P.; Zhang, S.; Chung, T. S., Pressure retarded osmosis dual-layer hollow fiber membranes developed by co-casting method and ammonium persulfate (APS) treatment. *Journal of Membrane Science* 2014, 469, 488-498.

TABLE 1

Outer diameter, mean pore size, standard deviation, MWCO, collapse pressure and pure water permeance (PWP) of Ultem® hollow fiber supports

| Support | Outer diameter (µm) | $d_p$ (nm) | $\sigma_p$ | MWCO (kDa) | PWP ($Lm^{-2}bar^{-1}h^{-1}$) | Collapse pressure (bar) |
|---|---|---|---|---|---|---|
| HF-1 | 468 | 8.0 | 1.64 | 52.6 | 524 | 15 |
| HF-2 | 458 | 11.5 | 1.66 | 104.0 | 952 | 11 |
| HF-3 | 468 | 5.9 | 1.77 | 35.9 | 131 | 18 |
| HF-4 | 527 | 5.1 | 1.88 | 31.1 | 270 | 17 |

Supplemental Discussion:

Materials

Polyetherimide Ultem® 1000 was provided by SABIC (Saudi Arabia), diethylene glycol (DEG, 99%, Alfa-Aesar) and N-methyl-2-pyrrolidinone (NMP, ≥99.5%, Merck) were used to prepare the dope for the fabrication of hollow fiber supports. For the synthesis of the selective layer, trimesoyl chloride (TMC), m-phenylene diamine (MPD), n-hexane, methanol, ethanol and 1-propanol were obtained from Sigma-Aldrich, USA. Polyethylene glycol (PEG) 2K, PEG 10K, PEG 20K, and PEG 35K were purchased from Merck to measure the pore size distribution of hollow fiber supports. Sodium chloride (NaCl, ≥99.5%, Merck) was used to prepare feed and draw solutions.

Interfacial Polymerization Process for Outer-Selective PRO TFC Hollow Fiber Membranes To fabricate TFC membranes, the aqueous phase was a MPD solution (2 wt % in water) and the organic phase was a trimesoyl chloride TMC solution (0.15 v/v % in hexane). The interfacial polymerization was carried out on the outer surface of the Ultem® hollow fiber substrates. Prior to this process, one end of the fibers were sealed with epoxy, pre-wetted with alcohols in 20 s and then stabilized in DI water for 30 min. The fibers were consequently dipped in the aqueous amine solution for 3 min at room temperature. After blotted with tissue papers to remove the excess liquid on the outer surface, the fibers were immersed into the TMC solution for 2 min to carry out interfacial polymerization. After the reaction, the fibers were rinsed with n-hexane for 2 min to remove excess monomers. Then, the sealed ends of the fibers were cut and the fibers were then immersed in a 25:75 (vol %) glycerol/water solution overnight, and finally dried in air.

Positron Annihilation Spectroscopy (PAS)

The free volume of the polyamide layer and the mean depth profiles of the dual-layer hollow fibers were characterized by doppler broadening energy spectroscopy (DBES) using positron annihilation spectroscopy (PAS), coupled with a slow positron beam. $^{22}Na$ isotope with the energy of 50 mCi was used as a positron source. The hollow fiber samples were aligned tightly along the axis direction on an aluminum plate. Two layers of fibers were packed to ensure a seamless surface. A more detailed description of the setup can be found elsewhere[1]. The mean implantation depth (Z in nm) of a fiber cross-section was correlated with the incident positron energy (E in keV) by the following equation:

$$Z(E) = \frac{40}{\rho} E^{1.6} \quad (1)$$

Where $\rho$ is the density of the polymer material in g/cm$^3$. Two parameters, S and R, were often used to characterize free volume of the polyamide layer and microscopic porosity of the asymmetric support, respectively. The S parameter is directly related to free volume and estimated from DBES results as the ratio of the central part of the PAS spectrum to the total[2,3].

Collapse Pressure

Collapse pressure tests were carried out for the supports using a lab-scale PRO setup, where a high-pressure pump (Hydra-cell) was employed to recirculate DI water at the shell side of the fibers at 0.2 Lmin$^{-1}$ under gradually increased pressure. A peristaltic pump (Cole-Palmer) was used to recirculate DI water at 0.017 Lmin$^{-1}$ at the lumen side of the fibers[4]. The collapse pressure is defined as the pressure applied on the shell side at which the fiber was collapsed.

Sorption Tests

The sorption tests of the supports in water and alcohols were carried out using the analogous flat-sheet membranes fabricated from the similar dope solution of the hollow fibers. The flat-sheet strips were weighed before immersion into sorption solutions, which were kept in a closed vessel at room temperature. The swollen strips were then taken out, blotted with tissue paper and then weighed in a closed container. The degree of sorption of the supports was calculated by the equation:

$$DS = \frac{W_s - W_o}{W_o} \quad (2)$$

where $W_s$ and $W_o$ are the weights of the swollen and the dry strips, respectively.

Pore Structural Properties of Hollow Fiber Supports

Pore structural properties of hollow fiber supports, including pure water permeability, MWCO, pore size, and pore size distribution were determined by using nanofiltration experiments in a lab-scale circulating filtration unit as previously described[5]. Since the selective layer is formed on the outer surface of the fibers, the feed solutions were pumped into their shell side, while the permeate solution were extracted from their lumen side. The pure water permeance PWP (Lm$^{-2}$bar$^{-1}$h$^{-1}$) was measured by circulating water into the module at a constant flow rate of 0.2 Lmin$^{-1}$ under a pressure of 1 bar and then calculated using the equation:

$$PWP = \frac{Q}{\Delta P \times A_m} \quad (3)$$

where Q is the water permeation volumetric flow rate (L/h), $A_m$ is the effective area (m$^2$), and $\Delta P$ is the transmembrane pressure drop (bar).

Pore size, pore size distribution, and MWCO of hollow fiber supports were estimated via solute separation experiments with 200 ppm neutral organic solutes (PEG with different molecular weights) by circulating the feed solutions through the modules at 1 bar. The system was stabilized for 1 h before both feed and permeate were collected 3 times for the consecutive time intervals of 0.5 h. The variation of rejection was less than 2%. Concentrations of feed and permeate were measured by a total organic carbon analyzer (TOC, Shimazu). The solute rejection $R_T$ (%) was calculated using the equation:

$$R_T(\%) = \left(1 - \frac{c_p}{c_f}\right) \quad (4)$$

where $c_p$ and $c_f$ are the solute concentrations in the permeate and feed solutions, respectively. From the relationship between $R_T$ (%) and solute molecular weight, pore size, pore size distribution, and MWCO can be calculated as previously described[5].

Reverse Osmosis Evaluation of the TFC PRO Hollow Fiber Membranes

Each TFC PRO hollow fiber membrane was tested for its pure water permeance, A (Lm$^{-2}$bar$^{-1}$h$^{-1}$) in the similar method and equation for those of the supports. The salt rejection was then measured with 200 ppm NaCl at 0.2 Lmin$^{-1}$ at 1 bar and calculated using eq. 4. Accordingly, the salt permeance B can be determined based on the equation:

$$\frac{1 - R_T}{R_T} = \frac{1}{(\Delta P - \Delta \pi)} B \quad (5)$$

where $\Delta P$ is the applied transmembrane hydraulic pressure and $\Delta \pi$ is the osmotic pressure difference between the feed and permeate.

Forward Osmosis (FO) Performance

FO tests were conducted using a bench-scale FO setup. The draw solution (1 M NaCl) and the feed solution (DI water) were counter-currently recirculated into the shell side and lumen side with the flow rates of 0.2 and 0.05 Lmin$^{-1}$, respectively. The lumen side pressure was kept below 2 psi. The water permeation flux, ($J_w$, Lm$^{-2}$h$^{-1}$, abbreviated as LMH) was calculated from the following equation:

$$J_w = \frac{\Delta v}{A_m t} \quad (6)$$

where $\Delta v$ is the volume change of the feed solution over a predetermined time t (h) and $A_m$ (m$^2$) is the effective membrane area. The salt reverse flux, $J_s$, in gm$^{-2}$h$^{-1}$ (abbreviated as gMH), was calculated from the following equation:

$$J_s = \frac{(c_t v_t - c_o v_o)}{A_m t} \quad (7)$$

where $c_o$ and $v_o$ are the salt concentration and volume of the initial feed; and $c_t$ and $v_t$ are the salt concentration and volume of the final feed, respectively. The experiments were repeated 3 times and their average values were reported.

TABLE 2

Spinning conditions of Ultem ® hollow fiber supports

| Spinning parameters | HF-1 | HF-2 | HF-3 | HF-4 |
|---|---|---|---|---|
| Dope solution (wt. %) | Ultem/DEG//NMP 17/13/70 | Ultem/DEG//NMP 17/13/70 | Ultem/DEG//NMP 17/11/72 | Ultem/DEG//NMP 17/13/70 |
| Bore fluid (wt. %) | NMP:water (90:10) | NMP:water (95:5) | NMP:water (90:10) | NMP:water (90:10) |
| Dimensions of spinneret | 0.6:0.9 | 0.6:0.9 | 0.6:0.9 | 0.6:0.9 |
| External coagulant | Water | Water | Water | Water |
| Temperature (° C.) | Ambient | Ambient | Ambient | Ambient |
| Dope flow rate (ml/min) | 6 | 6 | 6 | 6 |
| Bore fluid flow rate (ml/min) | 3 | 3 | 3 | 3 |
| Air gap distance (cm) | 1 | 1 | 1 | 1 |
| Take-up speed (m/min) | 36 | 36 | 36 | 30 |

TABLE 3

Physicochemical properties of Ultem ®, water, methanol, ethanol, n-propanol and n-hexane

| Solvent/polymer | Molecular weight (g/mol) | Density (g/cm$^3$)[6] at 20° C. | Viscosity × 10$^3$ (Pa · s)[7] | Solubility parameter (MPa$^{1/2}$)[8] | Surface tension at 25° C. (mNm$^{-1}$)[9] |
|---|---|---|---|---|---|
| Water | 18.02 | 0.998 | 0.890 | 47.9 | 72.01 |
| Methanol | 32.04 | 0.793 | 0.547 | 29.6 | 22.51 |
| Ethanol | 46.07 | 0.790 | 1.140 | 26.5 | 21.82 |
| n-Propanol | 60.10 | 0.804 | 1.950[10] | 24.5 | 23.28 |
| n-Hexane | 86.18 | 0.655[11] | 0.298[11] | 30.4[12] | 17.94[13] |
| Ultem ® 1000 | 39000 | 1.27[14] | N.A | 23.7[15] | N.A |

TABLE 4

Mechanical properties of Ultem ® hollow fiber supports

| Support | Maximum tensile stress (MPa) | Maximum tensile strain (%) | Young's modulus (MPa) |
|---|---|---|---|
| HF-1 | 5.50 ± 0.43 | 9.04 ± 1.02 | 201.7 ± 12.3 |
| HF-2 | 5.28 ± 0.44 | 4.05 ± 1.38 | 164.5 ± 8.8 |
| HF-3 | 5.74 ± 0.17 | 5.14 ± 0.40 | 255.1 ± 14.1 |
| HF-4 | 5.85 ± 0.37 | 10.32 ± 1.26 | 230.5 ± 17.3 |

REFERENCES

1. Li, F. Y.; Li, Y.; Chung, T.-S.; Chen, H.; Jean, Y.; Kawi, S., Development and positron annihilation spectroscopy (PAS) characterization of polyamide imide (PAI)-polyethersulfone (PES) based defect-free dual-layer hollow fiber membranes with an ultrathin dense-selective layer for gas separation. *Journal of Membrane Science* 2011, 378, (1), 541-550.
2. Hung, W.-S.; De Guzman, M.; Huang, S.-H.; Lee, K.-R.; Jean, Y.; Lai, J.-Y., Characterizing free volumes and layer structures in asymmetric thin-film polymeric membranes in the wet condition using the variable monoenergy slow positron beam. *Macromolecules* 2010, 43, (14), 6127-6134.
3. Zuo, J.; Wang, Y.; Sun, S. P.; Chung, T.-S., Molecular design of thin film composite (TFC) hollow fiber membranes for isopropanol dehydration via pervaporation. *Journal of Membrane Science* 2012, 405, 123-133.
4. Sun, S.-P.; Chung, T.-S., Outer-Selective Pressure-Retarded Osmosis Hollow Fiber Membranes from Vacuum-Assisted Interfacial Polymerization for Osmotic Power Generation. *Environmental science & technology* 2013, 47, (22), 13167-13174.
5. Wang, K. Y.; Matsuura, T.; Chung, T.-S.; Guo, W. F., The effects of flow angle and shear rate within the spinneret on the separation performance of poly (ethersulfone)(PES) ultrafiltration hollow fiber membranes. *Journal of membrane science* 2004, 240, (1), 67-79.
6. Valtz, A.; Teodorescu, M.; Wichterle, I.; Richon, D., Liquid densities and excess molar volumes for water+diethylene glycolamine, and water, methanol, ethanol, 1-propanol+triethylene glycol binary systems at atmospheric pressure and temperatures in the range of 283.15-363.15 K. *Fluid phase equilibria* 2004, 215, (2), 129-142.
7. Weast, R. C.; Astle, M. J., *CRC Handbook of Chemistry and Physics.* 63rd ed.; CRC Press: Florida, 1982-1983.
8. Barton, A. F., Solubility parameters. *Chemical Reviews* 1975, 75, (6), 731-753.
9. Vazquez, G.; Alvarez, E.; Navaza, J. M., Surface tension of alcohol water+water from 20 to 50. degree. C. *Journal of chemical and engineering data* 1995, 40, (3), 611-614.
10. Bessire, D. R.; Quitevis, E. L., Effect of temperature and viscosity on rotational diffusion of merocyanine 540 in polar solvents. *The Journal of Physical Chemistry* 1994, 98, (49), 13083-13092.
11. Aminabhavi, T.; Patil, V.; Aralaguppi, M.; Phayde, H., Density, viscosity, and refractive index of the binary mixtures of cyclohexane with hexane, heptane, octane, nonane, and decane at (298.15, 303.15, and 308.15) K. *Journal of Chemical & Engineering Data* 1996, 41, (3), 521-525.
12. Sivaraman, N.; Dhamodaran, R.; Kaliappan, I.; Srinivasan, T.; Rao, P. V.; Mathews, C., Solubility of C60 in organic solvents. *The Journal of Organic Chemistry* 1992, 57, (22), 6077-6079.

13. Schmidt, R. L.; Randall, J. C.; Clever, H. L., The surface tension and density of binary hydrocarbon mixtures: benzene-n-hexane and benzene-n-dodecane. *The Journal of Physical Chemistry* 1966, 70, (12), 3912-3916.
14. Gasa, J. V.; Weiss, R.; Shaw, M. T., Influence of blend miscibility on the proton conductivity and methanol permeability of polymer electrolyte blends. *Journal of Polymer Science Part B: Polymer Physics* 2006, 44, (16), 2253-2266.
15. Bicerano, J., *Prediction of polymer properties* Marcel Dekker: New York 1993.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composite material, comprising:
a hollow fiber having a polyetherimide inside layer and a smooth polyamide outside layer, wherein the outside layer directly covers the polyetherimide on an outside surface of the inside layer, wherein the inside layer forms a boundary around the lumen, wherein the inside layer includes a bi-layer structure, wherein the bi-layer structure includes:
a. a sponge-like layer having a fully cellular structure disposed closer to the lumen of the hollow fiber; and
b. a finger-like layer having macrovoids of about 30 to 50 µm in length radiating from a boundary with the sponge-like layer toward the outside surface of the inside layer,
wherein the outside surface of the inside layer is porous and has a mean pore size of about 5.1-5.9 µm, wherein the smooth polyamide outside layer is prepared by a process comprising:
pre-wetting the outside surface of the inside layer with an alcohol selected from the group consisting of methanol, ethanol, and 1-propanol; dipping the pre-wetted outside surface in an aqueous amine solution; and forming the polyamide outside layer by interfacial polymerization.

2. The composite material of claim 1, wherein the polyetherimide has the following formula: $(C_{37}H_{24}O_6N_2)_n$, wherein n is about 30 to 60.

3. The composite material of claim 1, wherein the aqueous amine solution includes a diamine selected from the group consisting of aliphatic diamines, aromatic diamines, piperazine, m-phenylenediamine, and p-phenylenediamine and interfacial polymerization includes immersing the dipped inside layer in a diacid chloride solution.

4. The composite material of claim 1, wherein the sponge-like layer has a cross-sectional pore size of about 0.1 to 5 µm.

5. The composite material of claim 1, wherein the macrovoids have a width of 4 to 7 µm.

6. The composite material of claim 1, wherein the polyamide outside layer has a thickness from about 172 nm to less than 245 nm.

7. The composite material of claim 1, wherein the polyetherimide inside layer has an outside diameter of about 460 to about 530 µm.

8. The composite material of claim 7, wherein the lumen has a diameter of about 250 to 300 µm.

9. The composite material of claim 1, wherein the polyetherimide inside layer has a thickness of about 87 to 103 µm.

10. A pressure-retarded osmosis system, comprising:
a membrane module comprising a plurality of hollow fibers, wherein each hollow fiber has a polyetherimide inside layer and a smooth polyamide outside layer, wherein the outside layer directly covers the polyetherimide on an outside surface of the inside layer, wherein the inside layer includes a bi-layer structure, wherein the bi-layer structure includes:
a. a sponge-like layer having a fully cellular structure disposed closer to the lumen of the hollow fiber; and
b. a finger-like layer having macrovoids of about 30 to 50 µm in length radiating from a boundary with the sponge-like layer toward the outside surface of the inside layer,
wherein the outside surface of the inside layer is porous and has a mean pore size of about 5.1-5.9 µm, wherein the smooth polyamide outside layer is prepared by a process comprising:
pre-wetting the outer surface of the inside layer with an alcohol selected from the group consisting of methanol, ethanol, and 1-propanol; dipping the pre-wetted outer surface in an aqueous amine solution; and forming the polyamide outside layer by interfacial polymerization.

11. The pressure-retarded osmosis system of claim 10, wherein the polyetherimide has the following formula: $(C_{37}H_{24}O_6N_2)_n$, wherein n is about 30 to 60.

12. The pressure-retarded osmosis system of claim 10, wherein the sponge-like layer has a cross-sectional pore size of about 0.1 to 5 µm.

13. The pressure-retarded osmosis system of claim 10, the macrovoids have a width of about 4 to 7 µm.

14. The pressure-retarded osmosis system of claim 10, wherein the polyamide layer has a thickness of from about 172 nm to less than 245 nm.

15. The composite material of claim 1, wherein the polyetherimide inside layer is prepared by dry-jet wet spinning comprising extruding a dope solution consisting of polyetherimide, N-methyl-2-pyrrolidone (NMP) and diethylene glycol using a bore fluid consisting of water and NMP and drawing the extruded hollow fiber into a water bath at a take-up speed of 30 m/min.

16. The composite material of claim 1, wherein the alcohol is 1-propanol.

17. The pressure-retarded osmosis system of claim 10, wherein the alcohol is 1-propanol.

* * * * *